Dec. 10, 1968  S. A. CROSBY  3,415,557
TYING IMPLEMENT AND METHOD
Filed June 6, 1966  7 Sheets-Sheet 1
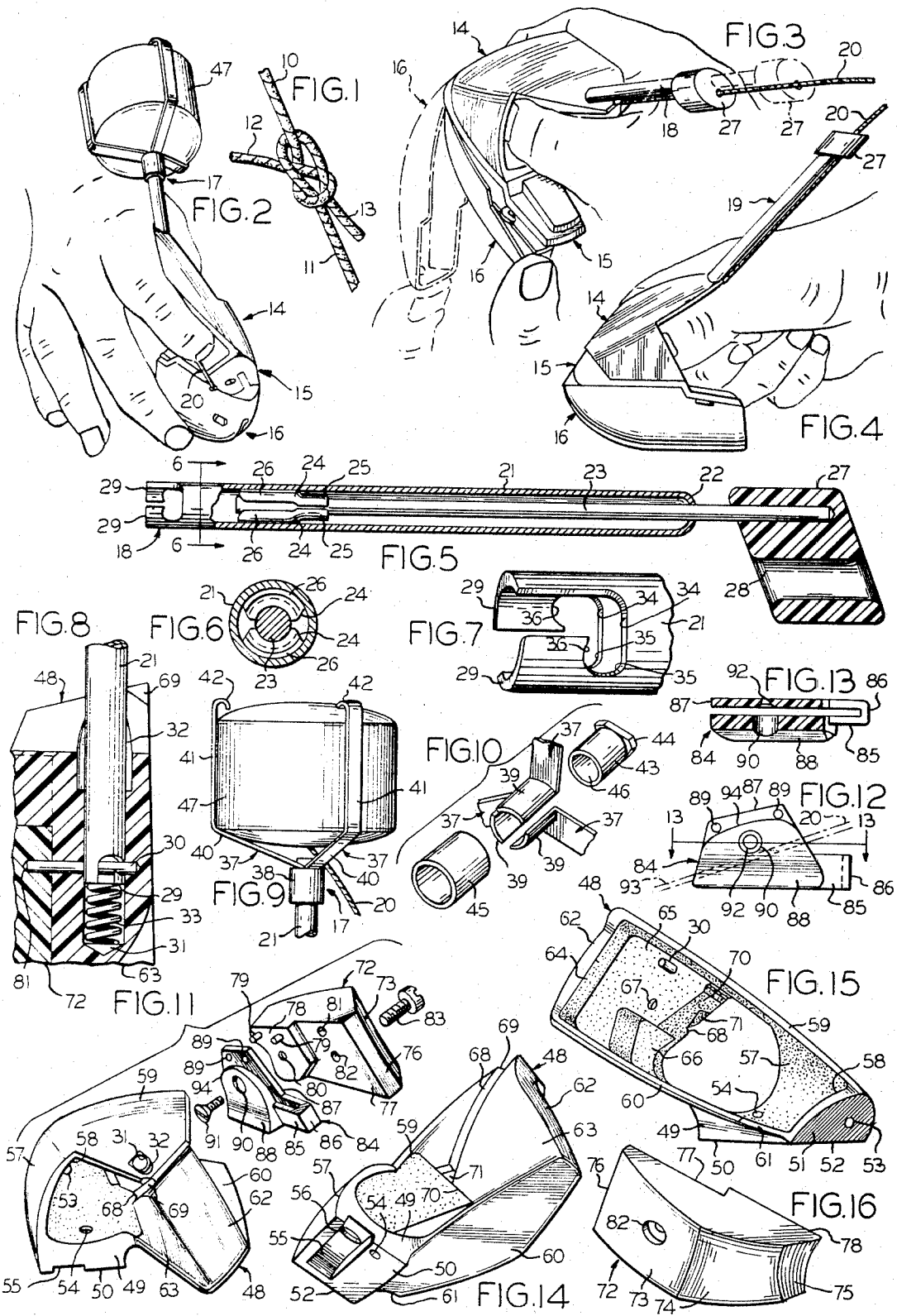

Dec. 10, 1968
S. A. CROSBY
3,415,557
TYING IMPLEMENT AND METHOD
Filed June 6, 1966
7 Sheets-Sheet 2
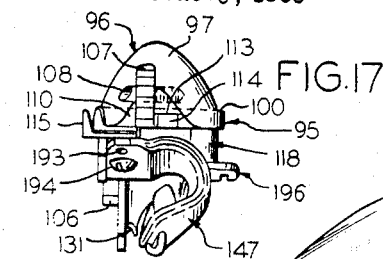
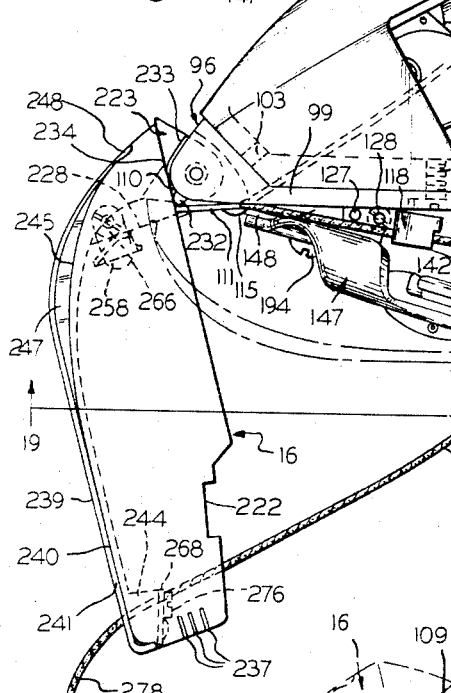
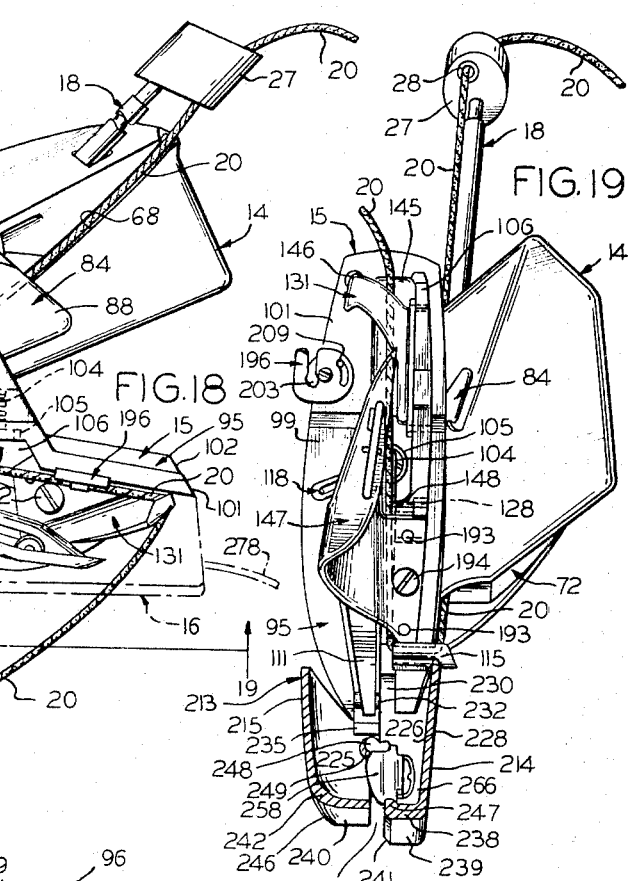
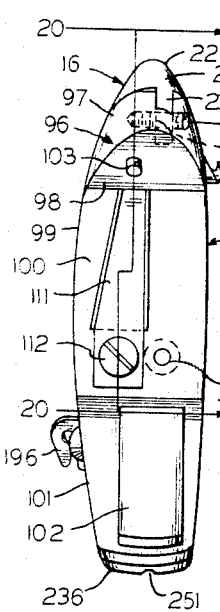
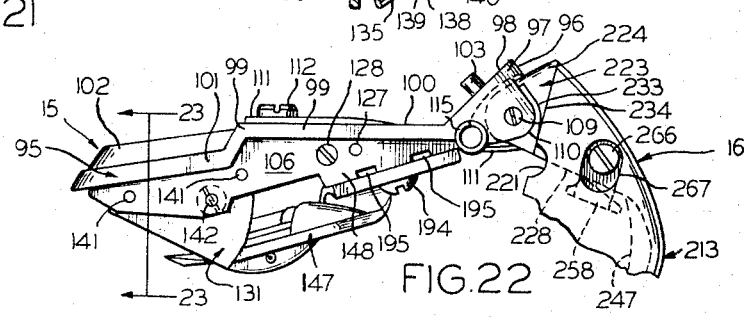

Dec. 10, 1968  S. A. CROSBY  3,415,557
TYING IMPLEMENT AND METHOD
Filed June 6, 1966  7 Sheets-Sheet 3
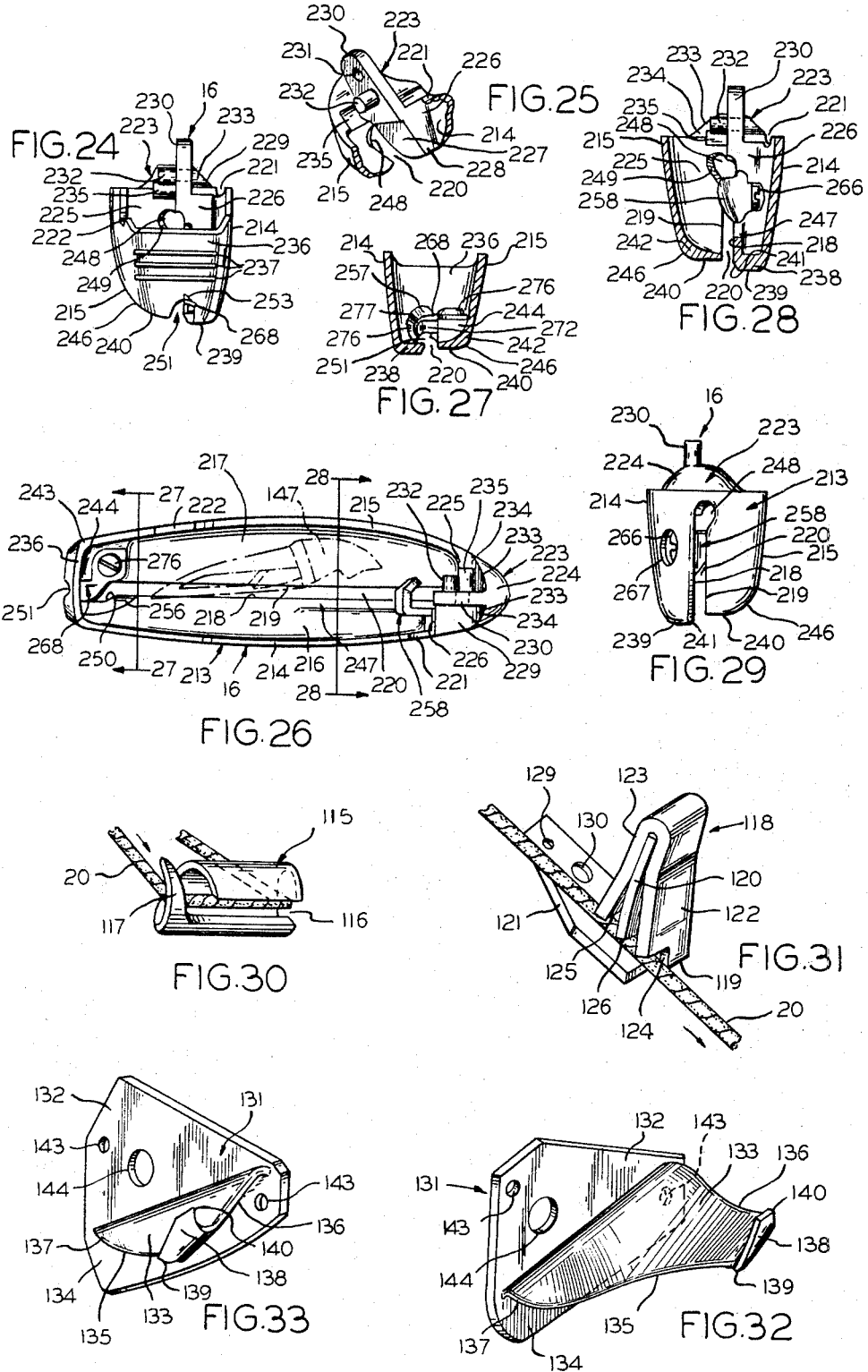

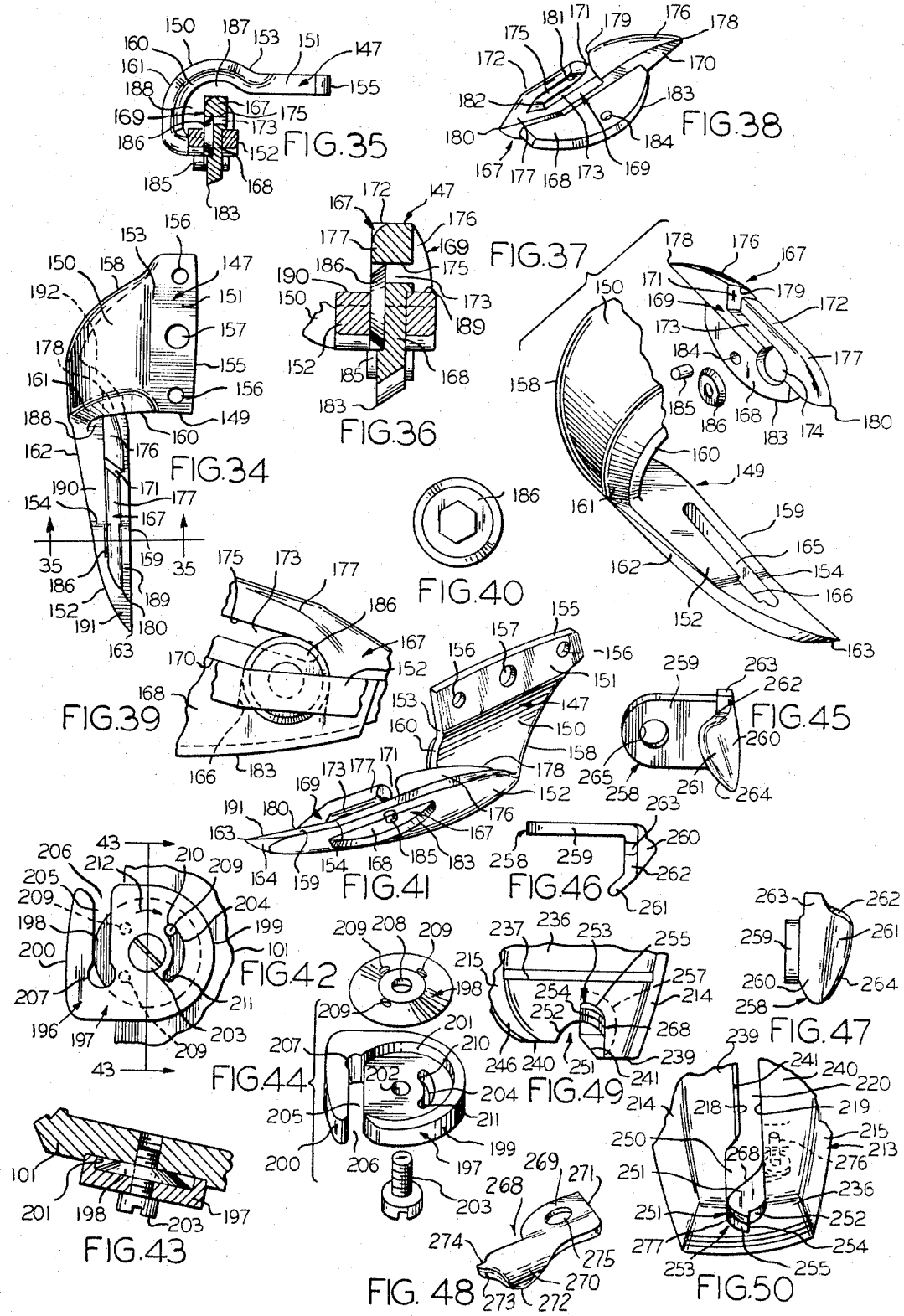

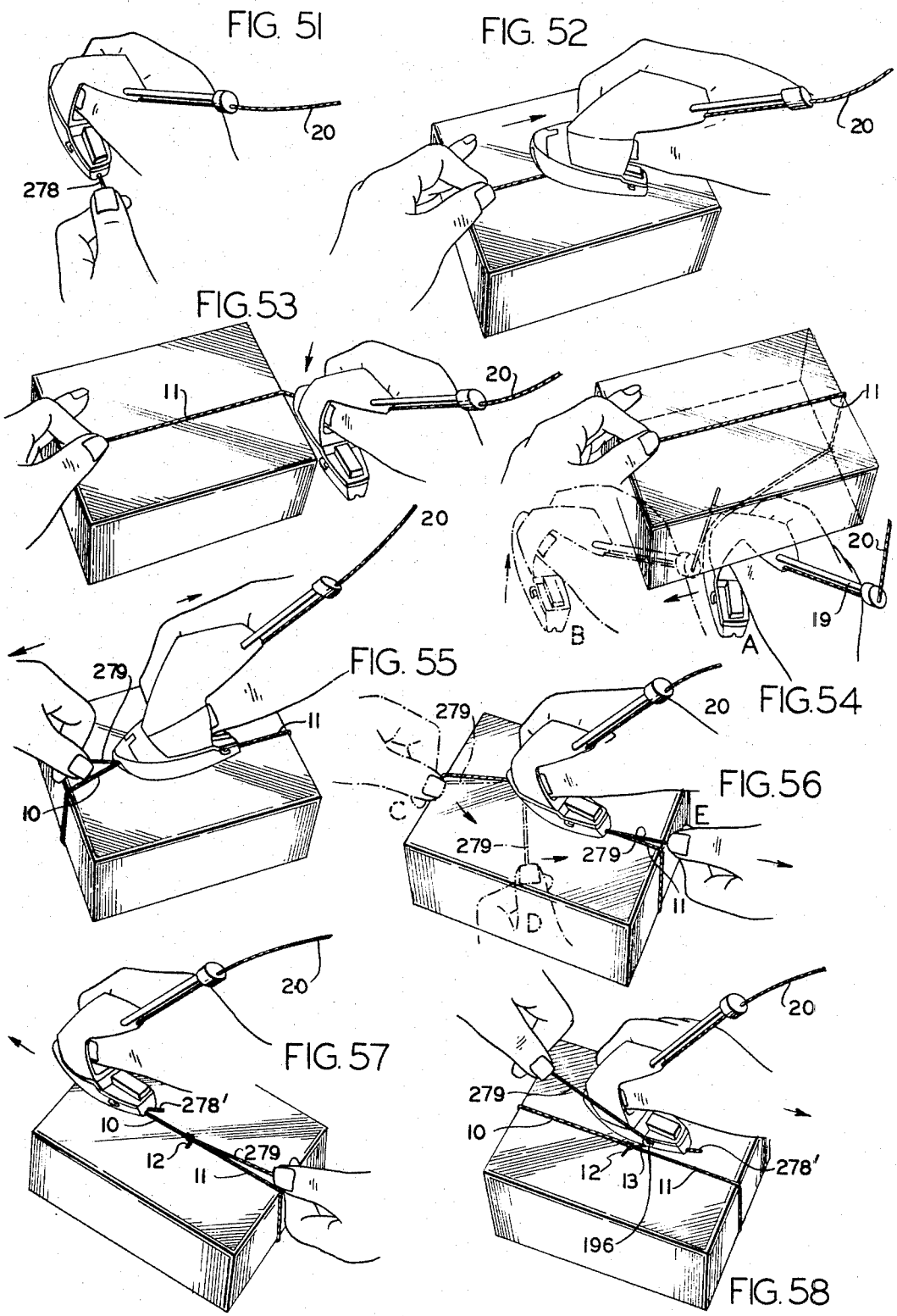

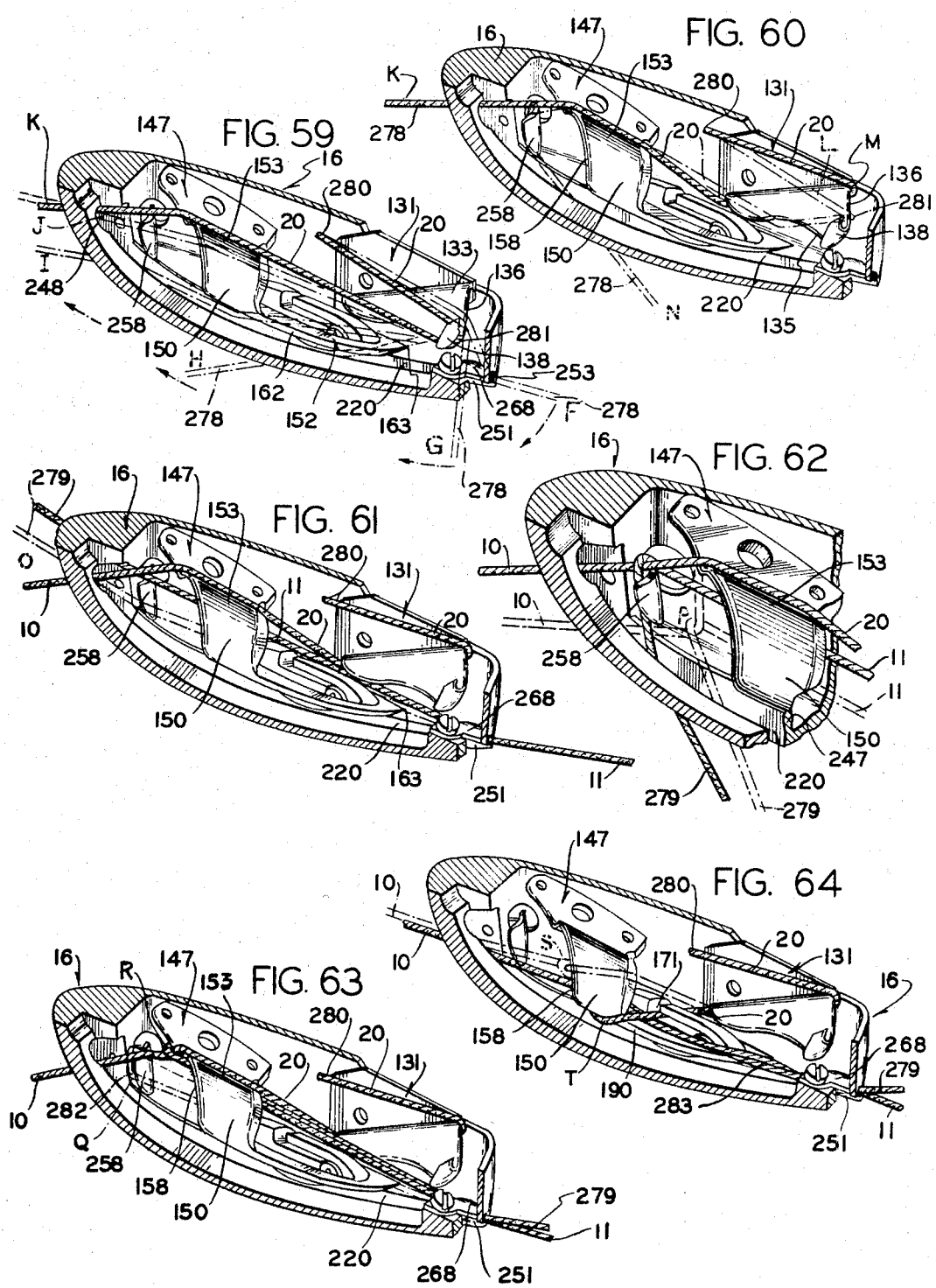

Dec. 10, 1968    S. A. CROSBY    3,415,557
TYING IMPLEMENT AND METHOD
Filed June 6, 1966    7 Sheets-Sheet 7
FIG 65
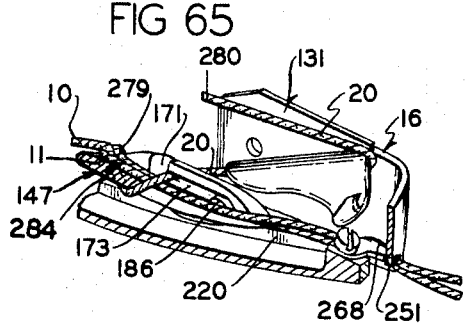
FIG. 66
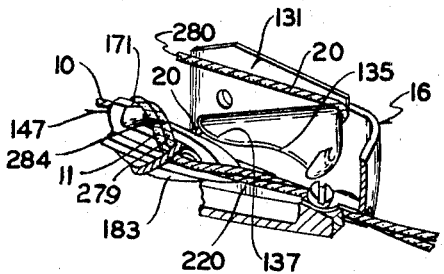
FIG. 67
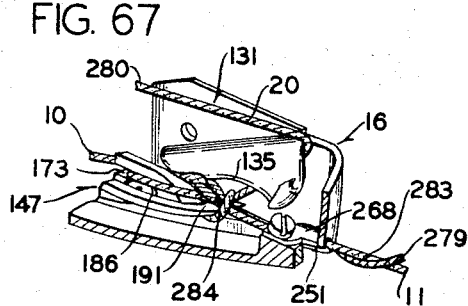
FIG. 68
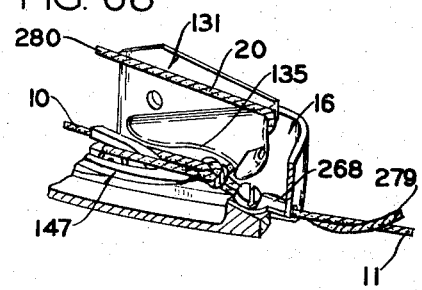
FIG. 69
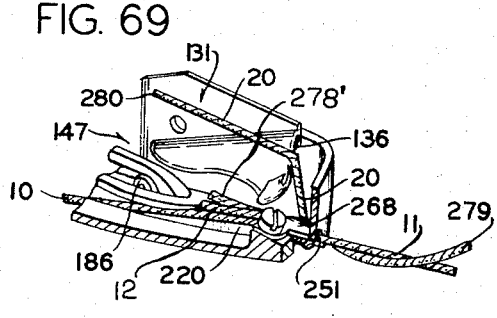
FIG. 70
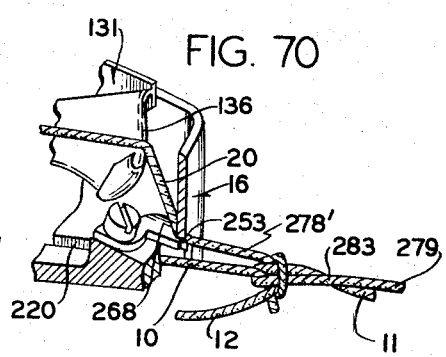
FIG. 71
FIG. 72
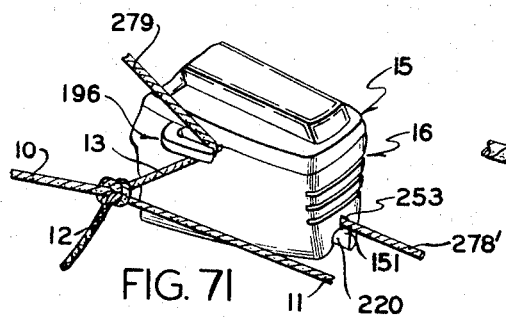

United States Patent Office 3,415,557
Patented Dec. 10, 1968

3,415,557
TYING IMPLEMENT AND METHOD
Stephen A. Crosby, 815 Shore Drive, P.O. Box 736,
Twin Lakes, Wis. 53181
Filed June 6, 1966, Ser. No. 555,590
46 Claims. (Cl. 289—1.5)

ABSTRACT OF THE DISCLOSURE

A hand held and manipulated cord or twine tying implement containing a tying bill and guides immovably held on the interior of the implement and through which the cord or twine is fed, the parts of the implement on its interior being capable of directing the twine to tie a weaver's knot as the implement is moved longitudinally along the tensioned twine or cord, such as when the cord extends about a package.

---

The present invention relates generally to the art of tying cords or strands and more specifically to hand implements for and methods of tying twine, particularly in binding packages, parcels, bundles and the like.

The art of mechanically tying cords or strands is a venerable one and machanisms for tying knots have long been known and are highly developed. Power relatively complicated machines for tying packages and the like employing such knot tying mechanisms are commercially available and widely used where the volume of work produced justifies their cost.

On the other hand, although almost everyone is confronted on occasion with the task of tying a package with twine, no inexpensive, simple implement, insofar as I am aware, is commercially available for the purpose and, consequently, despite the familier inconveniences attending the task, the practice continues as it has from ancient times of performing the operation manually.

The prior art reflects several relatively ancient proposals for simple implements for the indicated purpose, but the latter in general have left certain essential functions unmechanized, with the result that the operator would have to memorize and execute a sequence of manual manipulations requiring perhaps as much dexterity as is required without an implement. The devices of the prior art, insofar as I am aware, have not come into general use. The use of substitutes such as gummed tape has become widespread in recent years, but the use of twine continues in many applications despite the attending inconveniences. The art relating to implements for the purpose has been stagnant for over forty years.

By the present invention a simple, expeditious and novel method of tying a package and tying the weaver's knot is provided and a novel implement adapted to carry out the method is also provided which, having virtually no moving mechanism, automatically, in response to simple, instinctive, manual manipulations, performs among others all essential functions, including drawing the twine about the package, controlling the twine tension, belaying the twine during knotting, tying the knot, tightening the knot, severing the twine, feeding out a length of twine preparatory to a subsequent tying operation, and finally retightening the knot and trimming the twine.

It is an object of the invention to provide a novel, expeditious method of tying a package and tying the weaver's knot.

It is another object of the invention to provide an enclosed, well balanced hand implement for tying packages which can be conveniently manipulated about the package while comfortably gripped between the thumb and forefinger of one hand, leaving the other fingers free to manipulate or hold the package.

It is another object of the invention to provide instantly interchangeable twine supply holding and guiding accessories.

It is another object of the invention to provide a simple twine tension controller, instinctively operable responsive to finger pressure.

It is another object of the invention to provide a novel check to prevent accidental movement of the twine in the reverse direction and consequent unthreading of the implement.

It is another object of the invention to provide an implement adapted automatically to tie the weaver's knot and sever the twine responsive to a single, longitudinal, bodily movement of the implement.

It is another object of the invention to provide a mechanically simplified implement for tying the weaver's knot, which implement has a relatively stationary bill which requires no moving driving mechanism, and which will accommodate a range of twine sizes without alteration or adjustment.

It is another object of the invention to provide a novel, simplified bill for tying the weaver's knot.

It is another object of the invention to provide novel, improved twine cutters.

It is still another object of the invention to provide a tying implement having a protective sheath for the knot tying expedients which, without the use of tools, may instantly be opened for inspection, threading, adjustment and repair.

It is moreover another object of the invention to provide a novel means and method whereby the implement, after binding a package, is automatically left in threaded condition with the end of the twine exposed for grasping to initiate a succeeding tying operation.

It is indeed another object of the invention to provide a simple tying implement which can be manufactured and sold at low cost, which may be operated in a natural, instinctive, and convenient manner, and which will be reliable, serviceable and foolproof.

The foregoing, together with additional objects, features and advantages which now will become apparent are attained by and reside in part in the structure of a presently preferred embodiment of the invention, and in part in the method comprehended by the invention, both of which are hereinafter fully described, reference being had to the accompanying drawings forming a part hereof, wherein like numerals refer to like parts throughout, and in which FIG. 1 is a perspective view of the knot tied by my implement and method, namely, the so-called "left handed" weaver's knot, shown loosened;

FIG. 2 is an elevation in perspective of my implement, with the twine ball holder installed, showing how the handle, gripped between the thumb and forefinger of the right hand, leaves the middle, ring, and little fingers free to hold or manipulate the package;

FIG. 3 is a top view in perspective of my implement, with the extensible twine guide stem installed, showing how the thumb rests naturally upon the tension controller, and how the sheath may be swung open to render the knot tying expedients accessible;

FIG. 4 is a side elevation of my implement, with the inextensible twine guide stem installed, showing the manner of gripping the handle between the thumb and forefinger, the remaining fingers being in inactive position;

FIG. 5 is an enlarged longitudinal view, partially in section, showing the extensible twine guide;

FIG. 6 is an enlarged sectional view taken on the line 6—6 of FIG. 5;

FIG. 7 is a perspective view, to a greatly enlarged scale, of the typical, slotted, bayonet lock end of the twine guide and twine ball holder barrels;

FIG. 8 is an enlarged, fragmentary, top sectional view of the handle, cut through the central axis of the stem socket, showing the bayonet socket with a typical slotted barrel installed;

FIG. 9 is a side elevation on reduced scale of the twine ball holder;

FIG. 10 is a fragmentary, exploded view in perspective of the twine ball holder assembly, minus the barrel;

FIG. 11 is an exploded view in perspective of certain elements of the handle assembly;

FIG. 12 is a side elevation of the tension controller;

FIG. 13 is a sectional view of the tension controller cut on the line 13—13 of FIG. 12.

FIG. 14 is a bottom perspective view of the handle body;

FIG. 15 is a side view in perspective of the handle body with bayonet socket elements assembled;

FIG. 16 is a right side perspective view of the handle insert;

FIG. 17 is a front elevation of the frame assembly with the spring removed;

FIG. 18 is a side elevation of the implement with the sheath in open position;

FIG. 19 is a bottom view of the implement taken from line 19—19 of FIG. 18 which cuts the open sheath sectionally;

FIG. 20 is an enlarged fragmentary sectional view taken on the line 20—20 of FIG. 21, showing the construction of the "snap-action" expedients which retain the hinged sheath in either open or closed position;

FIG. 21 is a plan view of the implement with handle assembly removed;

FIG. 22 is a fragmentary side elevation of the implement with handle removed;

FIG. 23 is a sectional elevation taken on the line 23—23 of FIG. 22;

FIG. 24 is a rear elevation of the sheath assembly;

FIG. 25 is a fragmentary view in perspective of the sheath assembly;

FIG. 26 is a plan view of the sheath assembly;

FIG. 27 is an elevation in section taken on the line 27—27 of FIG. 26;

FIG. 28 is an elevation in section taken on the line 28—28 of FIG. 26;

FIG. 29 is a front elevation of the sheath assembly;

FIG. 30 is a front perspective view of the check;

FIG. 31 is a perspective view of the check;

FIG. 32 is a front perspective view of the feeder;

FIG. 33 is a rear perspective view of the feeder;

FIG. 34 is a top plan view of the bill assembly;

FIG. 35 is a sectional elevation of the bill assembly taken on the line 35—35 of FIG. 34;

FIG. 36 is a fragmentary enlargement of FIG. 35;

FIG. 37 is a fragmentary exploded view in perspective of the bill assembly;

FIG. 38 is a bottom perspective view of the shuttle;

FIG. 39 is an enlarged, fragmentary elevation of the bill assembly showing the bow cutter assembled;

FIG. 40 is an enlarged view of a bow cutter per se with modified central aperture;

FIG. 41 is a bottom perspective view of the bill assembly;

FIG. 42 is an enlarged bottom plan view of the fall cutter assembled with the frame, the latter shown fragmentarily;

FIG. 43 is a sectional view taken on the line 49—49 of FIG. 42;

FIG. 44 is an enlarged exploded view in perspective of the fall cutter components;

FIG. 45 is a side view in perspective of the inlet ramp;

FIG. 46 is a top plan view of the same;

FIG. 47 is a front elevation of the same;

FIG. 48 is a side perspective view of the outlet ramp;

FIG. 49 is an enlarged, fragmentary rear elevation of the sheath showing the outlet ramp assembled therein; and FIG. 50 is an enlarged fragmentary bottom view in perspective of the sheath, showing the outlet ramp assembled therein.

FIGS. 51 through 58 inclusive are perspective views showing successively in natural sequence how my implement is manually operated to execute the basic peripheral binding circui and subsequent motions in tying a package. More specifically, FIG. 51 shows how the twine end part left protruding from the rear of the sheath following the preceding tying operation is grasped by the left thumb and forefinger preparatory to initiating a tying operation;

FIG. 52 shows how the twine end part and the package are held by the fingers of the left hand while the implement, moved in clockwise direction, initiates the basic binding circuit;

FIG. 53 shows a subsequent transitory stage of the tying operation as the implement is moved downwardly at the right side of the package causing the twine, which initially emanated from the rear of the sheath, to emanate thereafter from the front of the sheath;

FIG. 54 shows a subsequent transitory stage of the tying operation as the implement, in executing the clockwise circuit about the package, is moved to the left along the bottom periphery of the package, and how the twine guide stem prevents the twine standing part from snagging upon the package;

FIG. 55 shows the implement in position on the surface of the package following completion of the basic binding circuit, after the tension controller has been activated to clamp the twine standing part, and the binding is being "cinched" by drawing in opposite directions on the twine end part and the implement;

FIG. 56 shows the next succeeding step in which the twine end part, while being held under tension, is brought around to the rear of the implement;

FIG. 57 shows, as the succeeding step, how the knot is tied and tightened, the bow cut, and a new twine end part drawn out of the rear of the sheath, all by a single, short, longitudinal forward movement of the implement, while the twine end part is held under tension by the thumb and forefinger of the left hand; and FIG. 58 shows the final step wherein the fall is cut off and the knot further tightened by introducing the fall into the fall cutter, and then moving the implement longitudinally a short distance rearwardly.

FIGS. 59 through 72 inclusive are fragmentary views in perspective showing, in natural sequence, the successive steps in the knotting operation. More specifically, FIG. 59 shows how, as the twine end which initially emanated from the rear of the sheath is brought forward along the sheath, the twine is caused to pass to the left around and finally over the bill and thereafter emanate from the front of the sheath;

FIG. 60 shows how the twine feeder moves the twine to knot tying position, and how the inlet ramp prevents the twine from dislodging during upward motion of the implement;

FIG. 61 shows how the twine rearward part enters the sheath through the slot therein and snaps over the inlet ramp during the cinching step of FIG. 55;

FIG. 62 shows how, as the fall is brought around to the rear of the sheath as in FIG. 56, the twine is controlled by the inlet ramp to prevent malfunctioning;

FIG. 63 shows how the fall, doubled back, forms with the rearward part a loop about the forward part, and the foregoing parts with the standing part from a loop about the shank of the bill;

FIG. 64 shows how, under tension applied in the fall, the loops are caused to move laterally along the spiraled leading edge of the bill shank, drawing the standing part across the shuttle and into the shuttle notch, and forming the loops into a convolution about the bill shank;

FIG. 65 shows how forward bodily movement of the bill initiates movement of the shuttle through the convolution to elevate the upper portion thereof and draw a bow of the standing part thereunder;

FIG. 66 shows how the angular orientation of the shuttle notch prevents snagging of the convolution therein, permitting free passage of the shuttle through the convolution, and how the shuttle tongue takes up excess slack developed in the convolution;

FIG. 67 shows how the bow is drawn through the convolution and how the knot is formed and tightened upon the upper deck of the bill terminal;

FIG. 68 shows how the knot is tightened by tension induced in the bow by resistance to cutting developed by the bow cutter;

FIG. 69 shows how, after the bow is severed, the outlet ramp passes over the knot as the latter draws the standing part around the edge of the outlet ramp;

FIG. 70 shows how the standing part, being grasped by the knot, is drawn over the outlet ramp and out of the rear of the sheath;

FIG. 71 shows how excess twine is severed from the fall by the fall cutter, and how a portion of the former standing part, now protruding from the rear of the sheath, has become the new end part for a subsequent tying operation; and FIG. 72 shows the left-handed weaver's knot, the end result of the foregoing sequence of operations.

A brief prefatory explanation of the terminology employed herein and of the principal considerations underlying the invention will render the detailed description more readily comprehensible.

By "package" I mean any object or collection of objects susceptible of being tied with twine. By "twine" I means any twine, cord, strand, ribbon, or the like, whether multi- or mono-filament, sufficiently flexible or pliable to bind a package and assume, when operated upon by my implement, the configuration of a knot. By "tying" a package, I mean the complete operation comprising two constituent operations, namely, the binding operation, i.e., drawing the twine around the package to completely girdle the same, and the knotting operation. Otherwise stated, I use the word "tying" to include both "binding" and "knotting."

I have observed that in tying a package manually, a right-handed person usually holds the free end of the twine, issuing from a source of supply such as a ball or cone, between the thumb and forefinger of the left hand, and the standing part, that is the twine part between the free end and the source of supply, between the thumb and forefinger of the right hand, leaving the middle, ring, and little fingers of both hands free of the twine to hold or manipulate the package. Then, with the left hand substantially stationary in space and with its three free fingers resting on the package at the left side thereof, the twine is drawn peripherally around the package by moving the right hand first along the top of the package toward the right side of the package, then downwardly along the right side, then to the left along the bottom of the package, drawing the twine under the package, then upwardly at the left side of the package, and then finally to the right along the top of the package a sufficient distance beyond intersection with the end of the twine to tie a knot, thus completing a clockwise girdling circuit of the package.

In order to provide space to draw the twine under the package, the latter is either raised above the supporting surface, such as that of a table, bench, counter or the like upon which it is resting, or moved toward the operator so at to partially overhang the edge of the supporting surface. Frequently, too, the package has a folded paper wrapping which must be held in place during the binding operation. It is therefore essential that three fingers of both hands be free to perform, if required, holding and manipulating functions during the binding operation.

As the twine is drawn around the package the tension of the binding is controlled by varying the pressure upon the twine between the thumb and forefinger of the right hand, the thumb and forefinger of the left hand gripping the twine sufficiently securely to supply the necessary reaction to the tension.

Of course, a left-handed person executes the binding operation in a similar manner, except that the functions of the hands are interchanged and the direction of the binding circuit is counter-clockwise. I refer to the above described natural method of binding a package as the "instinctive" method.

I provide a tying implement designed to conform in operation, as closely as is physically feasible, with the instinctive method, by providing a handle adapted to be securely but comfortably gripped between the thumb and forefinger of one hand, the midle, ring and little fingers of this hand being left free to hold or manipulate the package. The standing part is threaded completely through and beyond the implement so that the free twine end may be grasped by the thumb and forefinger of the other hand.

I have found that if the standing part from a remote source of supply is brought directly into the implement, it tends in binding to wrap about the hand, creating a distinct sense of annoyance, and to snag upon the package, creating great inconvenience. To obviate these conditions, I provide, mounted on the implement, an extension stem to support and guide the twine between the implement and the remote source of supply so that the twine cannot contact the hand and is held away from the package when binding. The stem length provided is such as to permit binding around the middle of the package without snagging. Since packages vary greatly in size, I provide for interchangeability of stems to suit conditions. Stems provided are of two types, fixed length and adjustable length, and these can be supplied in appropriately graduated sizes, although I have found that ordinarily one relatively short fixed length stem and one longer, variable length stem will adequately cover the range of package sizes up to 36 inches.

Since it may be preferred by some users to have the twine source, such as a small ball thereof, mounted directly upon the implement to move with the latter, rather than have the source remotely located, I provide a twine ball holder having mounting expedients similar to and interchangeable with the stems. Thus the stems and the ball holder constitute interchangeable accessories. By provision of a "plug in" feature comprising a bayonet-type lock, the accessories may instantaneously be interchanged by unplugging the undesired accessory and plugging in the desired one.

In order to provide for instinctive tension control in binding, I provide, mounted in the handle, a tension controller operable by application of pressure between the thumb and forefinger.

Generally, packages are tied with the operator in standing position, the package resting before him on a supporting surface of conventional height. It is desirable that the handle be so oriented with respect to the body of the implement that an operator can manipulate the latter with maximum freedom of movement of the wrist and with minimum discomfort and fatigue. I have found that these requirements are satisfied when the handle of the implement is skewed or tilted downwardly, both forwardly and inwardly. Additionally, in order to provide good visibility of the binding under the implement prior to, during, and subsequent to knotting, I offset the handle laterally with respect to the body of the implement, at such distance and angle of skew that the thumb is out of the operator's line of sight to the rear center of the implement. Moreover, in order to bring the tips of the free fingers of the hand into appropriate contact with the package surface, I space the handle upwardly away from the bottom surface of the implement. With the handle thus oriented with respect to the implement, the three free fingers have maximum range to hold and manipulate the package being bound or, alternately, to be doubled back without interference under the hand when not employed.

Orientation of the handle as thus described precludes operation with both right and left hands. That is to say, an implement arranged for right handed operation cannot conveniently be operated when held in the left hand. Left-handed implements may be provided for left-handed people if desired; but most left-handed people adapt rapidly to right-handed operation since no unusual dexterity is required. Accordingly the embodiment here disclosed is that arranged for right-handed operation.

Hereinafter, in referring to the directions "right" and "left," "up" and "down," and "forward" and "rearward," I mean these directions as normally sensed by the operator when holding the implement before him in his right hand with the thumb pointed away from his body.

In order to avoid the necessity for rotating mechanism such as has been traditional in knot tying machinery using the "rotary lateral bill" and the "sleeve and spindle" types of mechanism, and thus provide simplified knot tying expedients, I invoke the inherent tendency of the twine to shorten its length over supports when placed under tension. Thus the twine is caused to move laterally by being moved longitudinally under tension over ramp-like surfaces. Exploiting this principle, I achieve a highly simplified knot tying device without any relatively moving operative mechanism whatever, and thus provide a more reliable and less expensive implement which will accommodate a range of twine sizes without alteration or adjustment. Thus the implement has no bill in the sense of the traditional rotary lateral bill, but employs a relatively stationary member to form the knot. I call this member a bill, however, meaning that element around which the convolution of the knot is formed.

The implement is intended for occasional use by unskilled operators, and therefore it is desirable to have all working parts enclosed to protect them from damage due to abuse, such for example as accidental dropping; but, on the other hand, it is also desirable to provide instantaneous access without the use of tools to the working parts for inspection, adjustment and repair. To meet these conflicting requirements, I provide a protective housing or sheath which is hingedly connected to the frame of the implement and provided with "snap-action" expedients, so that it may be instantaneously swung to and retained in either open or closed position.

Since the twine is threaded completely through the implement so that motion of the latter can be employed to draw the twine about a package while the free end of the twine is held stationary, it is necessary, following initial threading and each succeeding tying operation, to provide, as the twine end, a length of twine protruding outboard of the implement a sufficient distance conveniently to be grasped between the thumb and forefinger. How to feed the twine end out of the implement without employing relatively moving mechanism poses a problem. I solve this problem without the use of any mechanism whatever, by tying first a so called "slippery" knot, that is, a knot with a bow, then severing the bow. Then, as the implement is moved away from the knot, the end, being frictionally enveloped in the knot as a severed half of the bow, is automatically drawn out of the implement and then out of the knot.

Turning now to the detailed description, reference being had first to FIG. 1, the knot tied by my implement is the well known "left-handed" weaver's knot; that is, the weaver's knot in which the two ends 12 and 13 are brought out on opposite lateral sides of the knot. I have found this to be a secure knot when finally tightened by pulling simultaneously in oppostie directions on forward part 10 and end 13. It will be understood that although shown fragmentarily, parts 10 and 11 are normally opposite parts of a continuous length of twine girdling a package.

End 12 is severed from the standing part, while end 13 is severed from a short length of twine held by the operator's left thumb and forefinger. The latter length of twine, between the original end and end 13, I designate the "fall." In the final step of the tying operation, the fall is cut off and discarded as will be more fully explained hereinafter.

Referring next to FIGS. 2, 3, and 4, the implement is comprised of three principal assemblies, namely, the handle assembly, generally designated 14; the frame assembly, generally designated 15, to the upper side of which the handle assembly is secured; and the sheath assembly, generally designated 16, hingedly connected to frame assembly 14 at the front thereof. I shall describe the handle assembly first, the frame assembly next, and the sheath assembly last.

To aid in supplying twine to the implement, I provide three diverse accessories selectable according to preference: a twine ball holder generally designated 17, shown in FIG. 2; an extensible stem, generally designated 18, shown in FIG. 3; and an inextensible stem, generally designated 19, shown in FIG. 4. Ball holder 17 may be employed when it is preferred to carry the twine supply with the implement, while stems 18 and 19 may be employed when it is desired to use twine from a remotely located supply source such as a cone or ball which, being both conventonal, are not shown. The standing part, i.e., the twine part leading from the supply source to and through the implement, is designated 20. The stems 18 and 19 are provided to support the standing part 20 away from the hand so as not to annoy the operator and to prevent it from snagging upon the package, as shown in FIG. 54.

Referring to FIG. 5, extensible stem 18 is an assembly comprised of an outer, metallic, tubular, cylindrical barrel member 21, annularly formed or crimped inwardly at its outer end 22 to define a concentric bore of reduced diameter adapted slidably to receive an inner, metallic, cylindrical extension rod 23, having secured near its inner end, as by welding or brazing, a pair of identical, resilient, friction generating members 24, 24 mounted in diametrically opposed relationship. Members 24, 24 are preferably formed from resilent sheet metal to provide fragmentary annular mounting portions 25, 25 of reduced inside diameter to mate with rod 23 for welding, and larger, fragmentary annular, integrally cantilevered shoe portions 26, 26. Initially sprung open to provide a diameter larger than the inside diameter of barrel 21 so as to engage the latter frictionally when assembled, shoe portions 26, 26 generate sufficient anchoring force to retain rod 23 at the desired axial location during operation but permit manual adjustment. Eccentrically secured to the outboard end of rod 23 is a twine guide head 27 having an eccentrically located, circular, axially directed aperture 28, diametrically spaced from rod 23, through which standing part 20 is rove. The walls of aperture 28 thus constitute a guide loosely grasping the standing part to draw the same laterally along with the implement. Head 27 is fabricated from cylindrical rod cut off slantingly to provide parallel, skewed, end faces, and may be made of any material sufficiently resistant to wear and breakage, nylon being preferred.

Inextensible stem 19, shown in FIG. 4, is exteriorly similar to extensible stem 18, but inner rod 23 with its friction generating members 24, 24 is omitted, and head 27 is provided with an enlarged mounting bore tightly receiving the outer end of barrel 21 in permanent assembly. Both extensible stem 18 and inextensible stem 19 may be provided in lengths suited to the purpose. Twine ball holder 17 is fitted with a barrel similar to but shorter than the barrels of stems 18 and 19.

Inner end 29 of barrel 21 is slotted as shown more clearly in FIG. 7 to provide a bayonet lock element engageable with a pin 30 (FIG. 8) by an inwardly directed axial sliding motion followed by a rotary motion. The inner ends 29 are identical in all three barrels, FIG. 7 being typical; that is, the barrels of ball holder 17, and the extensible and inextensible stems 18 and 19, respectively, are identical in having the typical bayonet inner end of FIG. 7, so that these accessories may instantly be interchanged.

Referring momentarily to FIG. 11, inclined blind circular aperture 31 entering through the top wall of handle 48 adjacent the left rear corner thereof constitutes a bayonet socket adapted freely to receive terminal 29, as shown more clearly in FIG. 8. Socket 31 enters at a shallow downward angle through the top face of the handle, constituting initially a progressively deepening groove 32 extending forwardly until the depth thereof exceeds slightly the diameter of the barrel, at which point the complete circular socket 31 begins. Fitted into mating apertures in the handle is previously noted pin 30 disposed with its axis perpendicular to the axis of the barrel and intersecting the latter. Pin 30 (FIGS. 8 and 15) is of excess length adapted to discharge an additional function which will be described presently.

Trapped in socket 31 by pin 30 is a stiff helical compression spring 33. When barrel 21 is removed from the socket, spring 33 expands axially to press outwardly against pin 30 with considerable force.

On insertion into the socket, a barrel is rotated until its slot straddles pin 30, then it is urged inwardly with sufficient force to compress the spring until the ends 34, 34 of the slot rest upon pin 30, and then the barrel is turned through an appropriate angle until the faces 35, 35 contact pin 30 and prevent further rotation. In assembly, spring 33 continuously urges arcuate faces 36, 36 of the terminal against pin 30 preventing accidental disengagement. To disengage the barrel, it is necessary first to revolve the latter, but this is discourged by the pressure of the spring, first in opposing the inward axial motion of the barrel necessary to disengage faces 36, 36 from the pin and, second, in frictionally opposing rotary motion. Thus the ball holder and guide stems may be manually interchanged, but when one of these accessories is "plugged in" it is securely held against accidental disassembly.

The twine ball holder (FIG. 9) is adapted to accommodate the "shrink-packed" twine balls, currently commercially available, in which a plastic covering is shrunk over the ball of twine after it is wound (U.S. Patent 2,720,309) permitting, in use, the twine to be stripped from the interior of the ball rather than from the exterior thereof. With the twine ball packaged in plastic sheet and the twine unwinding from the interior of the ball, the holder does not interfere with free unwinding.

The holder comprises three identical, resilient, metallic prongs 37, 37, 37 spaced equi-angularly around the ball, and permanently assembled in a hub-like mounting 38, more clearly shown in FIG. 10. Each prong 37 has a relatively short terminal portion 39 at its inner end, formed to define an arcuate cross-section and bent to lie parallel with the axis of the barrel, and an integral outwardly and upwardly extending spoke portion 40, integrally joined to an upwardly extending axially parallel portion 41 which terminates in an inwardly and downwardly reflexed, blunt hook 42. In assembly, terminals 39 are spaced around the periphery of an inner tubular bushing 43, having a triangular head flange 44 providing three equally spaced flat sides adapted to guide and align the three spaced prongs, and then outer cylindrical sleeve 45 is forced over terminals 39, the several parts being proportioned so that they force-fit into permanent assembly. Finally, a short barrel 21 (not shown in FIG. 10, see FIG. 9) having the typical slotted end 29 is forced into aperture 46 of bushing 41 to complete permanent assembly of the holder with its barrel.

A twine ball 47 is loaded into the holder by pushing it axially downwardly, the prongs deflecting resiliently outwardly during the insertion operation, permitting motion of the ball past terminals 42 which, after the ball is inserted, return to undeflected configuration and constrain the ball against accidental removal. When the twine of the ball has been consumed, the plastic covering, now without interior support, is readily removed.

The handle assembly (FIG. 11) generally designated 14 comprises, in addition to the pin 30 and the helical spring 33 already described, the handle body per se 48, the handle insert 72, and the tension controller 84, together with the associated conventional fastenings.

Handle body 48 is provided with a base portion 49, having a planar, horizontally disposed, bottom mounting surface 50 and a planar forward mounting surface 51 disposed at a 45 degree angle with respect to bottom surface 50 and meeting the latter in a lower front corner 52. The two planar surfaces 50 and 51 mate respectively with corresponding planar surfaces 100 and 98 on the top of frame 95 (FIGS. 18, 20, 21, and 22) to which the handle is rigidly but removably attached by two conventional fastenings to be noted later, namely, the dowel pin 103 and screw 104. Aperture 53 in surface 51 is a slip fit on dowel pin 103 and threaded aperture 54 in base portion 49 securely but removably receives screw 104. Bottom surface 50 is relieved by a shallow, elongated recess 55 of uniform width and arcuately decreasing depth forwardly, and modified rearwardly by a shallow, circular depression 56 to clear, respectively, the spring 111 and the head of its mounting screw 112 (FIG. 21) when the handle is assembled with the frame.

Base 49 integrally joins arcuate left side wall 57 and integral, sloping, front base wall 58, the left side wall reflexing arcuately over the base integrally to join top wall 59, which is generally offset to the right and skewed outwardly toward the rear at an angle of about 15 degrees, and which slopes upwardly at angles of about 30 degrees toward both the rear and the right. The base 49 and walls 57, 58, and 59 define a thumb cavity, opening to the rear and to the right, of sufficient size freely to accommodate the end portion of the operator's thumb. Top wall 59 is generally elongate pentagonal in plan, overhanging base 49 rearwardly and to the right. The right side of base 49 integrally joins bottom wall 60 which extends rearwardly and to the right under top wall 59. Bottom wall 60 is generally similar in outline to top wall 59 but has somewhat more rounded contours except at the front thereof, where it cuts abruptly in toward the base to define an arcuate relief 61. Walls 59 and 60 are generally parallel laterally but are spaced apart a distance that slightly increases rearwardly.

The walls are tied in spaced relationship by an integral rear wall 62 and a partial left side wall 63, both of which have contoured, smooth, outer surfaces adapted comfortably to fit a portion of the palm of the hand joining the thumb and forefinger. These walls have mutually perpendicular, planar, inner surfaces 64 and 65, respectively, adapted to abut planar mating surfaces 76 and 77 of insert 72 in assembly. Surface 65 is relieved by an elongate recess 66 adapted freely to clear portion 85 of tension controller 84 presently to be described. Wall 63 is sufficiently thick to accommodate the bayonet socket 31 previously described, and a suitable blind aperture receiving pin 30, as well as a blind threaded aperture 67 adapted removably to receive screw 83.

In order to accommodate and guide standing part 20, directing the latter into tension controller 84, the outer face of side wall 63 is provided with a groove 68 of substantially uniform width and depth, initiating in a notch 69 in the rear left corner of top wall 59 and directed downwardly and forwardly to terminate at the front end 70 of side wall 63, where it broadens abruptly upwardly to define a triangular recess 71 adapted to facilitate threading the standing part through the tension controller. The handle body may be fabricated as a non-ferrous casting, but conventional plastic material fabricated by molding is preferred.

Handle insert 72, preferably fabricated by a similar process and of the same material as the handle body, is in the nature of a "filler piece" adapted partially to fill the otherwise open right side of handle body 48 to provide outer surfaces 73, 74, and 75 contoured to fit the bent forefinger. In assembly, perpendicular planar mounting surfaces 76 and 77 abut, respectively, mating surfaces 64 and 65 of the handle. Outer surfaces 73 and 74 conform generally in outline to walls 59 and 60 except that the insert is shorter than the former to provide forward marginal surface 75 spaced rearwardly from wall 58 a distance sufficient to permit entry of the tip of the forefinger. Surface 77 is stepped to provide a raised planar boss 78 providing a mounting surface for the tension controller which is removably but firmly aligned therewith by conventional dowel pins 79, 79 permanently assembled by drive fit in appropriate blind receiving apertures in the face of boss 78. Blind threaded aperture 80 is provided in the boss to receive flat-headed machine screw 91. Another blind aperture 81 is provided in surface 77 slidably to receive the excess length previously noted of pin 30, retaining the latter when insert 72 is assembled with the handle (FIG. 8), the excess length of pin 30 received by aperture 81 functioning as a dowel to locate the insert with respect to the handle. A counterbored aperture 82 adapted freely to receive machine screw 83 with the head thereof set under flush of surface 73 is provided through the insert in register with threaded aperture 67 in the handle. Screw 83 securely but removably maintains the handle and insert in assembly.

The tension controller, generally designated 84 (FIGS. 11, 12, 13, and 18), is a unitary bifurcated member, generally of U-shape, the portion 85 near the base or end wall 86 of the U being relatively narrow. The right leg of the U is widened to constitute a planar mounting base 87 of substantially quadrilateral configuration, and the opposite leg of the U is widened, thickened, and contoured outwardly to form thumb-piece 88 having an inner, complementary, planar surface parallel to and spaced from base 87 by a distance slightly greater than the diameter of the largest twine to be used, so that the twine may run freely between the two portions when not activated by thumb pressure. Two circular apertures 89, 89 in registration with dowel pins 79, 79 and slidably receiving the latter, are produced through the base. A circular access aperture 90 through thumb-piece 88 freely passes the head of flat-headed screw 91 so that the latter can be received by concentric, countersunk aperture 92 through base 87, the countersink being of sufficient depth such that the upper surface of the screw head is under flush of the base surface and thus cannot interfere with passage of the standing part 20 when threaded through to the normal running position indicated by the broken line representation 93 in FIG. 12, in which position the standing part is retained by groove 68 (FIGS. 14 and 18) of the handle. To facilitate threading the standing part into the tension controller, thumb-piece 88 is of reduced height as compared with base 87, and is provided with an arcuate upper edge 94 (FIG. 12).

In assembly, the tension controller is first mounted upon boss 78 of the handle insert, the dowel pins 79, 79 being slidably received by registering apertures 89, 89 in base 87 so as to preserve the desired alignment. Screw 91 is passed through access aperture 90 and countersunk aperture 92 into threaded aperture 80 of the insert, and is then tightened home. Finally, the insert with tension controller attached is mounted in the handle and screw 83 driven home.

Base 87 of the tension controller is thus rigidly anchored upon boss 78, but the remainder of the tension controller is sprung free of any constraint, so that thumb-piece 88 may be resiliently deflected by light thumb pressure toward base 87, to bear upon the standing part, squeezing the latter between the complementary inner faces of the base 87 and thumb-piece 88. Reaction to thumb pressure is supplied by the forefinger bearing inwardly upon the outer surfaces of the insert and transmitted directly through the latter to base 87.

As will become apparent presently, it is desirable, in addition to regulating the tension in standing part 20, positively to clamp or belay the latter, holding the same immobile during the knot tying operation. I have found that substantially positive clamping action is achieved by the tension controller with relatively light squeezing pressure if the standing part is wrapped at least one turn around a stationary capstan after leaving the tension controller, exploiting the well known exponential increase in friction due to the so called "capstan effect." I provide a total of approximately one turn of wrap in passing one half turn around a twine chock and an additional half turn around a twine feeder, as will be described more fully hereinafter.

The tension controller may be fabricated from any material having acceptable wear resistance and resiliency, but I have found nylon to be satisfactory, its resiliency and wear resistance being of orders suitable for the purpose.

Having described the handle assembly, I pass now to the frame assembly, generally designated 15, which comprises the main frame per se 95, the spring 111, the chock 115, the check 118, the feeder 131, the bill assembly 147, and the fall cutter 196, together with the associated conventional fastenings.

The principle element of the frame assembly and indeed the main supporting structural element of the implement is the frame per se 95 (FIGS. 17, 18, 19, 20, 21, 22, and 23) which preferably is fabricated as a non-ferrous precision casting. Frame 95 has at its front an elevated nose 96 to provide a reinforced mounting for the sheath hinge elements to be described presently. Nose 96 has a smoothly rounded and faired, forwardly and downwardly tapering, front surface 97, and a rearwardly and downwardly sloped, planar rear surface 98. The nose integrally joins planar medial deck portion 99, the upper surface 100 of which, together with surface 98 just described, constitute mating surfaces for handle surfaces 50 and 51, respectively. Integrally joined at the rear to medial deck portion 99 is downwardly offset, downwardly and rearwardly extending, planar, rear deck portion 101, having a smaller, raised, rectangular cupola 102. In plan (FIG. 21) the frame is marginally contoured to join both the handle base 49 and the sheath 213 in smoothly faired exterior relationship, medial deck portion 99 being the same length as handle base surface 50.

A dowel pin 103 (FIGS. 18, 20, 21, and 22) is press fitted in permanent assembly into a receiving aperture perpendicular to face 98 of the nose to be slidably received by aperture 53 in handle; and a screw 104 is freely received by counterbored aperture 105 in the frame, passing upwardly to be securely but removably received by threaded aperture 54 in the handle. The handle is assembled with the frame by first pressing the handle home on dowel pin 103, then inserting screw 104 upwardly, and finally tightening the latter, the counterbore, produced on the under side of medial deck portion 99, setting the screw head under-flush to clear check 118 presently to be described. When the sheath is closed, medial deck portion 99 intervenes between the handle and the sheath.

An integral, depending, reinforcing rib 106 having an outer or right hand vertical face contoured in plan to clear the right side wall of the sheath when the latter is closed, runs longitudinally of the frame along the right under side thereof (FIGS. 17, 18, 19, and 22) and constitutes an elongate boss for mounting certain components to be described presently.

As seen in FIGS. 17, 18, 20, 21, and 22, nose 96 has a vertically disposed slot 107 produced rearwardly and adapted freely to receive an ear 230 of the sheath (FIGS. 24, 25, 26, 28, and 29) and an intersecting, horizontally directed, circular, blind aperture 108 entering from the right and threaded near its bottom end to receive a hinge pin 109 which is in the nature of a headless screw having an unthreaded body portion adapted to be received in a running fit by aperture 231 in the ear (FIG. 25). In assembly, hinge pin 109 is screwed home so that it bottoms tightly in aperture 108 and thereafter remains rotatively fixed relative to the frame. The sides of slot 107 bear laterally against the mating outer faces of ear 230 and serve to maintain alignment of the sheath with the frame. Nose 96 is rounded off in elevation at its forward end to define a radius 110 concentric with the axis of hinge pin 109.

In order to maintain the sheath in either open or closed position as chosen, I provide for mild or moderate "snap action." Ear 230 has a pin 232 extending to the left and located below and rearwardly of aperture 231, that is, eccentrically with respect thereto, so as to function as a crank pin with respect to the hinge pin (FIG. 25). A leaf spring 111 (FIGS. 18, 19, 20, 21, and 22) performed to assume, in elevation, a mild S-shape is anchored near its rearward end upon upper surface 100 of the frame by means of a binding screw 112 which is removably received by an appropriately threaded aperture in the frame. Spring 111 is tapered in plan (FIGS. 19 and 21) and its working length passes with ample working clearance through a corresponding longitudinal slot in the frame, so that it may bear directly upon the under side of pin 232 urging the latter upwardly. In the closed position of the sheath, the upper surface thereof abuts the frame constituting an upper limit in the closing motion, whereas in the open position pin 232 abuts the bottom surface 113 of a slot 114, determining the opposite limit of motion. Thus arranged, the sheath bears tightly against the frame in the closed position and may be swung open through an arc of approximately 75 degrees. In the closed position spring 111 urges the sheath closed, while in the open position the spring urges the sheath open, the pin 232 passing over dead center during the motion. The opening arc of 75 degrees is ample for the performance of all necessary servicing functions.

Rib 106 previously noted constitutes, in addition to a frame reinforcing expedient, an elongate boss upon which to mount all but one of the twine operative components of the frame assembly, all of which components will now be described, those mounted on rib 106 being taken in the order in which they are contacted by standing parts 20.

After passing through the tension controller, the standing part is directed forwardly and downwardly outside the implement, and then laterally to the left under deck 99 through a slit eye or port which I designate a "chock," and thence rearwardly under the frame deck along rib 106 (FIG. 19). Chock 115 (FIG. 30) is formed up from a flat blank of resilient sheet metal to constitute a circular tube slit to provide a slot 116 parallel with the tube axis throughout the major portion of its length, but spiraling right handedly around the tube substantially half a revolution at the outboard end, so as to form an integral retaining hook 117. In threading the chock, the standing part is readily rove through the slot and, subsequently, is prevented from escaping by hook 117 which functions as a retainer. Such retainer is desirable, for without the same the standing part may occasionally escape from the chock when the sheath is opened, with the possibility of becoming jammed between the sheath and the frame when the sheath is closed, resulting in unnecessary annoyance to the operator.

A fragmentary circular bore is directed transversely in the frame at the front end of rib 106 to receive the chock. The bore center is located slightly above the bottom face of the frame (FIGS. 17, 19, and 22) and the bore cuts the front end of rib 106, the under face of which projects somewhat below the centerline, so that the bore, although fragmentary, defines more than a half circle. As previously noted, chock 115 is fabricated of resilient metal, spring steel being preferred. As formed, the chock is left sprung slightly opened so that when pressed into its receiving fragmentary bore it is forced slightly closed and thereafter is permanently held by its inherent tendency to open. If desired, the chock may additionally be secured by supplementary means such as an adhesive. Provision of the fragmentary circular bore permits orientation of slot 116 forwardly and slightly below the bottom face of the deck so that free entry is had by the standing part through the slot. Being of spring steel, the chock is sufficiently abrasive resistant to enjoy a substantial life cycle but may readily be replaced if ever worn.

After leaving chock 115 where, doubled backwardly, its direction of motion relative to the frame is reversed, standing part 20 passes rearwardly next to the check 118. In order to insure unidirectional movement of the standing part through the implement to the end that the latter not become accidently unthreaded, I provide an expedient designated a "check" having a function somewhat analogous to that of a check-valve in a hydraulic system. As seen in FIG. 31, the check, generally designated 118, is comprised of two members, a frame 119, and a resilient reed 120. Frame 119 is preferably fabricated as a metal stamping, being formed up from an elongate, appropriately shaped, flat blank to provide a mounting base 121, and an integral overhangingly reflexed superstructure of substantially inverted Y-shape, one leg 122 of the Y being integral with an end of the base, and the other leg 123 approaching the top of the base but not joined thereto. Material is cut away at the end from both the base 121 and the leg 122, and also from leg 123, to define aligned notches 124 and 125, respectively, equal in depth to approximately half of the width of the base and of height sufficient to permit the largest twine to be used to run freely over the base and under reed terminal 126.

Reed 120 may be of any suitable resilient material, but nylon is preferred. Initially a flat piece of thin stock cut in rectangular pattern, the reed is permanently anchored in the frame by disposing one of its ends in intervening relation between legs 122 and 123 of the superstructure, and then forcibly squeezing the legs together, crimping them permanently upon the reed. The reed when mounted is inclined so that terminal 126 is advanced in the direction of free motion of the standing part. Thus, anchored at only one end, the reed is free at its opposite end or terminal 126 which approaches the base sufficiently closely to frictionally engage the smallest twine to be used.

In operation, as the twine is drawn in the direction of the arrow, the reed deflects in the direction of motion, its terminal 126 swinging arcuately upwardly and allowing the twine to pass freely therebeneath while, if opposite movement of the twine is attempted, the reed deflects in the reverse direction, arcuately swinging its terminal 126 closer to base 121 and jamming the twine between the terminal and the opposing surface of the base.

I have found nylon to be a satisfactory material for the reed, since it combines substantially ideal properties for the application. It is wear resistant, sufficiently flexible to deflect readily without inducing unnecessary friction, is sound deadening, and at the same time sufficiently stable as a column in compression to jam the twine securely, preventing unwanted motion.

Check 118 is mounted under the medial deck near the rear thereof upon the inner face of rib 106, being secured thereto by conventional fastenings comprising dowel pin 127 and machine screw 128 (FIGS. 17, 18, 19, and 22). Dowel pin 127 is permanently assembled by force fit in a receiving aperture in the rib, and is slidably received by an appropriate, registering aperture 129 in base 121. Screw 128 is removably received by threaded aperture 130 in base 121, after passing freely through an appropriate counterbored aperture in rib 106, the screw head being set into the counterbore so that it is under flush of the outer face of rib 106, in order to avoid interference with the sheath wall when the latter is in closed position. The check is mounted at a depending angle with respect to medial deck portion 99 so that the wide dimension of the reed terminal is disposed perpendicularly to the standing part axis (FIG. 18).

After leaving check 118, the standing part passes on rearwardly to the feeder, generally designated 131, mounted upon the inner face of rib 106 near the rear of the implement. Although a relatively stationary member, the feeder performs important twine feeding functions which will best be fully described hereinafter. It may be stated in passing, however, that the functions of the feeder are to dispose the standing part in proper relationship to the bill and to the sheath during the several phases of the tying operation. As seen in FIGS. 32 and 33 (see also FIGS. 17, 18, 19, and 22) the feeder is comprised of a vertically disposed, planar base plate 132, having five straight sides and a forward curved corner as shown, and an integral, outwardly overhanging and depending apron 133. The feeder may be fabricated as a precision investment casting, but I prefer to fabricate it as a permanent assembly of two metal stampings, one the base 132, and the other the apron 133. Rectangular slots, not shown, in the base receive corresponding lugs on the apron for temporary assembly, and then this temporary assembly is rendered unitary and integral by copper or silver brazing, resulting in a rigid, unitary member.

Apron 133 leaves the base 132 substantially perpendicularly thereto at a distance above the bottom edge of the base and then bends downwardly at a distance spaced from the adjacent face of the base, to constitute a downwardly opening channel defined by the under portion 134 of the base and the apron, of sufficient width freely to pass the largest twine to be employed. The apron is slightly shorter than the base so that the latter overhangs the apron at each end, and is generally triangular in plan, providing front and rear sloped and curved edges 135 and 136, respectively, both of which, after leaving the surface of the base at right angles, sweep arcuately outwardly and rearwardly, the latter sweeping rearwardly much more moderately (FIG. 19). In elevation, both front and rear edges sweep downwardly, the front edge much more abruptly, defining at the forward end thereof an arcuate lip 137, and then ultimately converge in an abrupt upward sweep to form an upstanding, outboard ear 138 having lower and upper overhanging terminals 139 and 140, respectively. Front edge 135 is preferably thinned to constitute a blunt, rounded, knife edge, and rear edge 136 is rounded and polished. The contours of the apron in plan, as well as in elevation are interrelated in controlling the standing part as will become more clearly apparent during the description of the operation. The under portion 134 of the base 132 and terminals 139 and 140 constitute guards to prevent disengagement of the standing part from the feeder.

The feeder is removably anchored to rib 106 by conventional fastenings comprising two dowel pins 141, 141 and a screw 142. The dowel pins are force fitted into appropriate receiving apertures in the latter rib so that they are permanently assembled in the latter, while two corresponding apertures 143, 143 in the feeder base register in slip fit on the dowels. Screw 142 is loosely received by aperture 144 in the feeder and is removably received by a registering threaded aperture in the rib.

When mounted, the feeder is disposed so that the apron is inclined upwardly, rearwardly, at an angle to the horizontal of approximately 30 degrees, the latter angle not being critical, with the rear edge of the apron adjacent the base extending above rear frame deck 101. To provide clearance for free running of the standing part along the higher portion of the rear edge of the feeder I provide the cupola 102, previously noted, on the rear deck. The cupola provides a clearance recess 145, as shown perhaps most clearly in FIG. 23. Additionally, a substantially hemispherical depression 146 is sunk into the under face of the rear deck just over terminal 140 of the feeder, into which the latter terminal projects slightly. Then, in threading the implement, when the standing part is brought over the feeder adjacent the under face of rear deck 101 it deflects slightly into depression 146 on entering, but is thereafter trapped, preventing accidental dislodgement, as will become more clearly apparent presently.

In tying mode, during the binding and knotting operations, the standing part after passing around feeder 131, returns forwardly to the bill assembly which will now be described in detail, reference being had principally to FIGS. 34 through 41 inclusive, although FIGS. 17, 18, 19, 22, and 26 should also be consulted. The bill assembly, generally designated 147, that component of the implement which ties the knot and cuts the bow, is mounted under the frame on a forwardly located, sloping face of rib 106, the latter being widened out to constitute a planar mounting pad or boss 148. When mounted, the bill assembly is sloped downwardly toward the rear at an angle of some 15 degrees with respect to the forward under face of the frame (FIG. 18) and, additionally, is canted in top plan to the right at the rear at an angle of some 6 degrees, so that prong rear terminal 163 slightly overhangs right margin 218 of slot 220 in the sheath, when the latter is closed, as shown in phantom in FIG. 26. The angles just given are not critical but are representative of good practice.

The bill assembly is comprised of the bill per se 149, the shuttle 167, the bow cutter 186 and the pin 185. The bill per se 149 may be fabricated as a stamping from sheet metal, preferably of thickness at least twice that of the largest twine to be tied, and produced initially as a flat blank of appropriate shape which is then coined to desired cross sectional configuration and finally formed into U-shape; but I prefer to fabricate it as a precision investment casting. Steel may be used if desired, but I have found silicon brass to be satisfactory. The bill 149, near its forward end, is reflexed to form, in cross section, a substantially U-shaped channel opening laterally to the right and constituting a shank portion 150. The upper leg of the U, enlarged to provide an integral mounting base portion 151 for the bill, overhangs the lower leg forwardly and laterally to the right while the opposite or lower leg of the U is sloped arcuately rearwardly and elongated relatively greatly to constitute an integral, rearwardly projecting prong 152. The upper leg of the U is planar throughout base portion 151, merging into shank portion 150 in an arcuate upward step 153, then swinging arcuately outwardly and downwardly, ultimately reflexing abruptly inwardly to bring the upper face of the lower leg parallel, in elevation, with the lower face of base portion 151 but spaced below and laterally to the left of the same.

Prong 152 of the lower leg extends rearwardly below and laterally to the left of the base 151, but parallel in elevation thereto for a portion of its length, then, at bend line 154, turns sharply upwardly at an angle of about 10 degrees. The right edge 155 of the base portion is contoured in plan to conform generally to the curvature of the inner face of the sheath wall to which, when the sheath is closed, it is adjacent but does not touch. Two smaller circular apertures 156, 156 one near each end of the base, and a third, larger, centrally located, circular aperture 157 are provided through the base to receive conventional fastenings to be described presently.

The leading or forward edge 158 of shank 150 is sloped arcuately rearwardly to constitute a ramp, starting in the left edge of base portion 151 and spiraling smoothly along the shank, ultimately merging with straight right edge 159 of the prong, (FIG. 41). The trailing or rear edge 160 of the shank spirals slightly rearwardly and merges smoothly but somewhat abruptly with the top surface of the prong at its left, forward edge. The leading edge 158 is rounded and polished to uniform smoothness to promote free movement of the twine therealong while the trailing edge 160 is provided with a relatively large exterior bevel or chamfer 161. The left side 162 of the prong steps inwardly very slightly at the point of juncture with the shank, then slopes moderately to the right to intersect bend line 154, where it begins swinging arcuately over toward the right, ultimately intersecting straight right edge 159 in a pointed rear terminal 163. The bill is of substantially uniform thickness throughout except near terminal 163 where the under side of the prong has fragmentary ogive 164 generating a point in terminal 163. Both sides of the prong are rounded and polished to promote free movement of the twine therealong. Prong 152 is pierced through by an elongated, longitudinally disposed aperture or slot 165, having a rectangular notch 166 produced in its left edge near the rear end of the slot, and adapted to receive tongue 168 of the shuttle, which will now be described.

Although not a shuttle in the strict sense of a flying shuttle in a loom, I use thihs nomenclature because the element performs a somewhat analogous function in drawing the bow through the convolution of the knot (FIGS. 65 through 68 inclusive). The shuttle, generally designated 167, is preferably fabricated of steel as a precision investment casting. It constitutes an elongate body having a relatively narrow, centrally disposed, depending tongue 168 integrally joined to a wider and longer, generally torpedo-shaped, upper ramp portion 169. Tongue 168 projects perpendicularly downwardly from planar bottom surface 170 of the ramp portion to define therewith a shoulder completely surrounding the tongue and adapted to mate with and seat upon the planar top surface of the bill prong.

A notch 171 of width equal to the diameter of the largest twine to be used is cut vertically downwardly through upper edge 172 of the ramp portion, crossing the latter slantingly at an angle of some 50 to 55 degrees with respect to the longitudinal axis of the shuttle and directed to the left, forwardly. A rectangular, longitudinally disposed slot 173, of width also equal to the diameter of the largest twine to be used, runs horizontally through ramp portion 169 parallel to base surface 170, and spaced above the latter a distance about equal to the diameter of the largest twine to be used. Slot 173 joins notch 171 at its forward end and, at the rearward end cuts into, and passes rearwardly beyond the center of, a shallow cylindrical recess or socket 174 in the left side of the shuttle, located vertically such that its upper edge is tangent to the upper planar face 175 of slot 173. Notch 171 divides the ramp portion into head and tail portions 176 and 177, respectively, of about equal height.

Head portion 176 is somewhat wider in plan than tail portion 177 and constitues an acclivity which rises arcuately from planar base surface 170 to join upper edge 172. The left side of the head is planar, but the right side is smoothly rounded toward the left, intersecting the left side in a relatively sharp point to constitute front terminal 178. Rearwardly from terminal 178, the head portion increases arcuately in both width and height, the right upper corner being rounded in a compound curve of increasing size rearwardly. The notch intersects the head abruptly to form substantially a sharp edge 179 at the juncture.

Narrower tail portion 177 is of substantially uniform height and width between notch 171 and the socket 174, at which latter general location it begins decreasing rapidly in height, sloping downwardly to end in rear terminal 180 which latter is sharp in elevation but bluntly rounded at the left in plan. Rearwardly, somewhat beyond socket 174, tail portion 177 begins arcuately decreasing in width as a result of rounding of the left side, the right side remaining planar. The upper edge 172 of the tail portion is rounded asymmetrically in cross section, the radius of the left corner being much larger than the radius of the right corner (FIGS. 35 and 36). As seen in FIG. 38, the lip 181 on the right side at the juncture of notch 171 and slot 173 is rounded smoothly, while the rear end of slot 173 is chamfered to constitute a short rounded groove 182 of decreasing depth rearwardly. The planar under surface of the shuttle, beginning about flush with the front edge of the socket, is sloped upwardly at an angle of some ten degrees to conform with the corresponding upward bend in the prong.

The bottom edge 183 of tongue 168 is arcuate in lateral elevational silhouette, and the arcuate portion is beveled or chamfered in cross section to constitute a blunt knife edge along the lower left corner. A circular aperture 184 through the tongue is adapted to receive a pin 185 in drive fit. Socket 174 snugly but slidingly receives a disc-like twine cutter 186 constituting a thin frusto-cone. In assembly, the base of the frusto-cone rests against the planar bottom of socket 174. The outer face of cutter 186 is flush with the left face of tail portion 177, but since the tongue 168 is thinner, the cutter overhangs the left face of the tongue. To receive the cutter in assembly, the slot 165 in the prong is provided with notch 166. All surfaces of the shuttle contacted by the twine are polished.

Assembly of the four components exemplified in FIG. 37 is effected by first placing the cutter in its socket, then inserting the tongue of the shuttle into slot 165 of the prong, trapping the cutter in its socket, and finally pressing in a pin 185 as shown in FIG. 41. Pin 185 is a press fit in the tongue aperture 184 and lies closely adjacent the under surface of the prong, extending beyond or overhanging the tongue on both sides to provide positive retention of the shuttle in the prong.

Thus assembled, the cutter is related to the other components as exemplified in FIGS. 36 and 39, the top edge of the cutter being tangent to the upper flat face 175 of the slot 173. In operation the twine passing through the slot is supported by face 175 while it is severed by the peripheral edge of the cutter. Now it is a feature of my invention that the twine of the bow not be cut too readily by the cutter, since resistance to cutting the bow is utilized to create tension in the bow and thus draw the knot tight. This requirement may be met by providing a rather dull cutter or, alternatively, a cutter having its peripheral edge spaced from upper face 175 of slot 173 so as to sever the twine of the bow only partially, permitting the unsevered portion to break across the rear terminal of slot 173 when the desired tension is applied. Although satisfactory where the twine used is all of nearly identical size, the latter expedient tends to develop insufficient tension for uniform knot tightness in twines of increasing size, since the breaking tension remains approximately constant. On the other hand, the former expedient provides substantially automatic variation of tension, for resistance to cutting increases with twine size. It is, therefore, preferred. Consequently, I make the cutter of diameter sufficient to fit closely in its socket and locate the latter such that the cutter edge lies directly in contact with upper flat face 175 of the slot. The necessary cutting resistance is generated by employing a cutter of relatively small diameter, that is, of the order of four times the diameter of the largest twine to be cut, and providing a rather blunt cutting edge that, for cotton twine, is of the order of 25 to 35 degrees; that is, the angle of the chamfer on the rim of the cutter is 25 to 35 degrees with respect to the cutter axis. Otherwise stated, the included angle of the cutter frusto-cone is 50 to 70 degrees. The angle can be given only in general terms because the angle chosen obviously depends upon the nature of the material to be cut, the amount of tension required to draw the knot tight and so on. I have found, however, that for cotton twine an angle of 20 degrees, as a lower extreme, generates excessive resistance, while an angle of 40 degrees, as an upper extreme, generates too little resistance, and that best results are had with angles between 25 and 35 degrees.

Cutter 186 is a component of relatively easy fabrication, being initially a flat circular blank punched from sheet tool steel, then subsequently hardened, and finally ground peripherally to produce the chamfered cutting edge. The resulting peripheral cutting edge is much longer linearly than the small sector of the edge exposed to cutting in slot 173 (FIG. 39) and when the exposed portion has become dull through use, the cutter may be revolved slightly in its socket to present a new sharp sector of the periphery to the slot, which may be repeated several times before all of the sharp periphery has become dulled. To revolve the cutter, the shuttle is removed from the prong and the cutter turned manually. The latter operation may be rendered more convenient by providing a hexagonal central aperture as shown in FIG. 40, rather than the circular central aperture shown in the remaining figures. The hexagonal aperture is produced by punching or broaching to fit an appropriate size of conventional, hexagonal, Allen wrench, so that the latter may be employed for more precise control in turning the cutter through small predetermined angles. However, I have found that due to the blunt cutting edge, the cutter has exceptionally long service life, so that frequent turning is unnecessary. Where, however, usage is such that a longer cutter life is desired, a harder material such as tungsten carbide may be employed. In any event, when the entire peripheral edge of a cutter has become dulled through use, a new, sharp cutter may readily be substituted. While wear on the opposing flat face 175 of the slot is virtually nonexistent, it may, if necessary following long periods of exceptional activity, be renewed by replacing the shuttle with a new one.

As seen in FIG. 35, when the shuttle is assembled with the bill, ramp portion 169 is of less height than the under face of shank portion 150, leaving a vertical gap 187 of sufficient height to pass the largest twine to be used. The left side face of ramp portion 169 is spaced laterally from the opposing inner face of shank portion 150 a horizontal distance approximately equal to twice the diameter of the largest twine to be used, defining an upwardly opening channel 188. As seen in FIGS. 34 and 36, ramp portion 169 is both narrower and shorter than prong 152, leaving top, planar, overhanging shoulders or decks 189 along the right side of tail portion 177, 190 along the left side thereof, 191 between terminal 180 of tail portion 177 and terminal 163 of prong 152, and 192 between terminal 178 and leading edge 158 of the bill. The reason for providing the gaps and decks just noted will become more clearly apparent during the description of the operation.

The bill assembly is secured to boss 148 by means of conventional fastenings comprising two dowels 193, 193 and a round headed machine screw 194. The dowels 193, 193 are permanently assembled by force fit into appropriate apertures in the face of boss 148 and are snugly received by registering aperture 156, 156 previously noted. Screw 194 is freely received by aperture 157 and is securely but removably received by an appropriate, concentric, threaded aperture in the face of boss 148.

Attention is directed to the fact that, since prong 152 is offset laterally with respect to dowels 193, 193 an appreciable torque is developed during the knotting operation, tending to turn the bill assembly about screw 194 and shear dowels 193, 193. Consequently, they are made of ample size and snugly fitted into their receiving apertures 156, 156. Since the bill assembly is snugly fitted on its dowels, it is usually necessary to pry the bill assembly in order to remove it from the dowels. To facilitate the prying operation rectangular notches 195, 195 are produced in the face of boss 148 to receive an appropriate pry bar (see FIG. 22).

In order to provide for trimming the fall 279 to provide an end of length approximating that of end 12 (FIGS. 1, 71, and 72), I provide a fall cutter generally designated 196. Fall cutter 196 constitutes a component of frame assembly 15, being mounted on the under side of rear deck 101 and partially overhanging outboard of the left side thereof (as exemplified in FIGS. 17, 18, 19, and 21). Referring now to FIGS. 42, 43, and 44, the fall cutter comprises a body 197, a disc-like cutter 198, and a conventional fastening. Body 197 constitutes a flat, generally oblong slab of metal preferably fabricated as a stamping and having, in plan, a rounded inner end 199 of radius equal to about half its width, and a rounded opposite or outboard end 200 of much larger radius to provide a smooth outboard contour. A shallow, cylindrical depression or socket 201, concentric with the radius of inner end 199, is produced in the top surface of the body to a depth slightly less than the thickness of the cutter, and of a diameter slidably receiving the latter. A circular aperture 202 is produced through the body coaxially with the socket to recive mounting screw 203. An acruate slot 204 with terminals equidistant to the right from the transverse centerline of the socket is also produced through the body. A straight slot 205, of width substantially equal to the diameter of the largest twine to be cut, is produced through the body to the left side of the socket near the outboard end. Slot 205 is cut through the rear edge of the body to provide an entrance mouth for the twine, which mouth is arcuately widened outwardly to provide a funnel-like opening 206 adapted readily to guide the twine into the slot. The latter extends forwardly from the rear edge of the body toward and beyond the longitudinal centerline of the same, where it terminates in a fragmentary circular enlargement 207. The slot is located so that its outer face is tangent to the socket wall and in contact with the periphery of the cutter.

Cutter 198 is a disc-like body preferably of hardened tool steel, constituting a thin frusto-cone. A central circular aperture 208 of diameter sufficient to pass screw 203 is provided at the cutter's center. Additionally, three other circular apertures 209, 290, 209 of equal diameter are spaced, in plan, at equal angles of 90 degrees and at equal radial distances from the cutter center. Stated otherwise, the angular spacing of apertures 209 is the same as though there were four apertures equally spaced, but one aperture is absent, leaving three apertures spaced 90 degrees. The radial spacing of the apertures out from the center of the cutter corresponds to that of arculate slot 204, so that the apertures may, by rotation of the cutter, be brought into registration with the former.

In assembly, body 197 is received by a shallow depression produced in the lower right surface of rear deck 101, which depression conforms in plan to the shape of the body, so as to receive the latter freely but constrain it against rotation even through screw 203, which is removably received by an appropriately threaded, concentrically located aperature in the frame, is slightly loosened. Since, as previously stated, the cutter is slightly thicker than the depth of its socket, screw 203, when tightened, clamps the body against the frame, holding it securely. When, however, the screw is loosened slightly, the cutter is released, and may be revolved independently of the body which, confined by its mating depression in the frame, is constrained against rotation and additionally is constrained laterally by the screw, so that the integrity of the assembly is preserved, whether the screw is tightened or slightly loosened.

The general principle of the fall cutter is identical with that of the bow cutter of the bill previously described, that is, a disc with sharpened periphery tangently contiguous to a flat surface, the latter supporting the twine while the disc excutes the cutting action. However, being for a somewhat different purpose, the fall cutter is modified over the bow cutter to suit the changed conditions. The fall cutter disc is of larger diameter to accomodate the apertures, and to provide somewhat less resistance to cutting. The frusto-cone of the fall cutter provides a much more acute cutting edge, being chambered at an angle of some 60 degrees with respect to the cutter axis, providing an included angle of 120 degrees instead of 60 to 70 degrees as in the bow cutter. The angle chosen is not critical, although considerable resistance to cutting is desirable as will appear hereinafter. The principal difference resides in the provision of more convenient expedients for revolving the cutter to present fresh sharp sectors of its periphery to the slot 205. FIG. 42 exemplifies the cutter assembly as seen by the operator when held with the sheath opened in the position of FIG. 19. When initially assembled in manufacture, the cutter is oriented in its body as show in FIGS. 19 and 42; that is, with only one aperture visible, the same being disposed at the upper or initial end 210 of the slot. Assuming that the sector of cutter periphery exposed to the twine in the slot has become dulled, and it is desired to revolve the cutter in the body so as to present a fresh sector of periphery to the twine, the screw is first loosened a turn or two, unclamping the cutter and freeing it for turning, then a sharp instrument such perhaps as a pencil or needle is inserted into the one aperture 209 appearing at the initial end 210 of the slot, and then the cutter is drawn around clockwise along the slot to the terminal end 211 of the latter, which end limits the angle turned through to 90 degrees. An arrow-like index 112 produced on the body indicates the direction to be turned but, since there is only one aperture 209 in the slot situated at the initial end thereof, the cutter can be turned only clockwise. On occasion for the next two turnings there will be apertures 209 in the slot, one at each end thereof, and the cutter could be turned in either direction, but the index 212 specifies the correct direction. However, when the third aperture has been turned to the terminal end of the slot, the blank fourth aperture location appears at the initial end of the slot and the cutter can be turned no farther clockwise. Appearance of the blank aperture location signals that the cutter is completely worn out and is to be replaced. This is readily accomplished by removing screw 203 completely, discarding the used cutter, inserting a fresh one, reassembling, and finally tightening the screw.

Naturally, a number of apertures different than the three just described may be used, if desired, to permit rotation of the cutter either more or less than the 90 degrees here provided for, if the angular length of slot 204 is appropriately modified.

Attention is directed to the assembled relationship of the feeder to the bill. The feeder 131 is so positioned that lip 137 (FIG. 32) of the feeder is about flush longitudinally with the forward edge of the bow cutter 186, and so that the standing part emanates from the front of the feeder slightly blow upper face 175 of slot 173 of the shuttle. Laterally, the shuttle is spaced to the right of edge 159 of the bill prong sufficiently such that lip 137 does not interfere with passage upwardly of the largest twine to be used. Front edge 137 of the feeder sweeps to the left, crossing over terminal deck 191 of the bill prong at a height above the latter sufficient to clear the knot being tied FIGS. 19, 67).

Having described the handle and frame assemblies, I pass finally to the sheath assembly, generally designated 16, which comprises the sheath per se 213 and components assembled directly thereto, namely, the pin 232 previously noted, inlet ramp 258 and outlet ramp 268, together with the associated conventional fastenings. See FIGS. 24 through 29 inclusive.

Sheath 213, preferably fabricated as a non-ferrous precision casting, constitutes an elongate, longitudinally cloven, boat-shaped housing, open at the top, and comprised of a pair of mutually complementary, spaced, right and left side shells, integrally joined only at their extreme ends. The shells constitute right and left space side walls 214 and 215, respectively, having integral, inwardly turned, right and left bottom walls 216 and 217, respectively, whose right and left opposed inner margins 218 and 219, respectively, define therebetween a straight longitudinal slot 220 of width equal approximately to twice the diameter of the largest twine to be used.

The top margins of the side walls lie sectionally in planes, the plane of the forward section being horizontally disposed, and the plane of the after section being downwardly both offset and sloped toward the rear, so that the top margins mate exactly with the under face of frame 95 which, overlying the sheath when closed, functions as a cover for the same. Appropriate clearance notches 221 and 222, cut downwardly from the upper margins, freely receive, respectively, outwardly protruding chock 115 and fall cutter 196 when the sheath is closed.

From the rear, the bottom walls run horizontally forwardly, then rise arcuately toward the upper margins, the left wall beginning its rise nearer the rear and rising less abruptly, the right wall beginning its rise farther from the rear and rising more abruptly, and both walls ultimately converging jointly to intersect the upper margins in a nose 223 which rises above and both forwardly and laterally overhangs the side wall margins. Nose 223 has a rounded, upper, forward, exterior surface 224 sloping arcuately upwardly and outwardly toward the rear which fairs smoothly with exterior frame nose surface 97. The side walls 214 and 215 converge arcuately inwardly toward the nose, merging with the bottom walls, the merger being rounded and fair.

At the front of the sheath, the inner faces of the shells rise more abruptly toward the perpendicular than the outer faces, the face of the right shell rising nearer the rear and more abruptly than the left, to define thickened, frontal, reinforcing right and left wall sections, the section on the left being designated 225. The section on the right is thicker longitudinally and constitutes interiorly an upstanding integral boss 226, having planar left and rear sides 227 and 228, respectively, the former vertically coincident with right bottom wall margin 218, the latter sloping slightly forwardly and ultimately intersecting a horizontal top face 229 flush with the upper margins of the side walls.

Rising from face 229, partially overhanging the same to the left, rearwardly of nose 223, and integrally joined thereto and to boss 226, is an upstanding ear 230 having planar, longitudinally disposed, right and left faces, spaced to be received in running fit by slot 107 in the frame nose. Ear 230 is transversely pierced by a circular aperture 231 to receive hinge pin 109 in running fit. Eccentrically located, somewhat below and to the rear of aperture 231, is another, similar aperture having permanently assembled by drive fit therein shouldered pin 232 previously noted which, urged upwardly by spring 111, provides the hinge snap action previously described.

Top face 229 of boss 226 and the upper horizontal face of left reinforcing section 225 join the rear face 233 of nose 223 in transversely disposed, coaxial, radial filets 234, 234 providing a clearance fit for radius 110 of frame nose 96. Above juncture with filets 234, 234 rear face 233 is canted forwardly to prevent interference with surface 97 of the frame nose when the sheath is in fully open position, as seen in FIG. 18. In assembly, nose 96 of the frame and nose 223 of the sheath provide a smooth, substantially contiguous, outer silhouette and a freely rotating hinge joint. A short, radial relief notch 235 is cut into the upper rear corner of left reinforcing section 225 to provide clearance for the front terminal of spring 111 when closing the sheath.

In transverse cross section, side walls 214 and 215 flare arcuately outwardly toward the top and, in plan, are bowed inwardly towards the ends, the left wall being bowed much more than the right wall, and the walls being spaced apart a greater distance at the rear than at the front. At the rear, the side walls integrally join a transverse rear wall 236 which, in plan, is bowed rearwardly and in elevation is canted slightly toward the front at the top. Spaced, horizontally disposed serrations 237, 237, 237 are cut across the exterior face of rear wall 236 providing a finger grip to facilitate opening and closing the sheath.

Right bottom wall 216 is thicker vertically than left bottom wall 217 (FIGS. 26, 28) to constitute, along its bottom surface, an integral, downwardly projecting, longitudinal rail or runner 238 having a planar bottom fiducial surface 239 adapted to rest upon the package surface and space the knot tying components of the implement a predetermined, fixed distance therefrom. Fiducial surface 239 extends below left bottom surface 240 a distance equal at least to the diameter of the largest twine to be used so that, with the implement in operative position on the surface of a package, the twine may readily be brought over the package and under left bottom surface 240 without snagging.

In order to promote easy entry of twine into slot 220, the lower inner corner of runner 238 is provided with a chamfer or bevel 241 which is continuous along fiducial surface 239 but ultimately vanishes as the right bottom wall rises to join the nose. Integrally joining forward reinforcing boss 226 to rear wall 236, runner 238 serves additionally to strength and support the right shell along its length. Exteriorly, the juncture of left side wall 215 with its bottom wall 217 is defined by a compound curve, and interiorly by a corresponding but much larger curve, the two curves defining between them, in cross section, a thickened wall section 242 constituting a longitudinal reinforcing expedient joining left front reinforcing section 225 to rear wall 236. Similarly, the interior radius at the juncture of left side wall 215 and rear wall 236 is much larger than the corresponding exterior radius, providing a thickened reinforcing vertical wall section 243. Additionally, an integral reinforcing boss 244 is provided at the juncture of left side wall 215, left bottom wall 217 and rear wall 236.

The easier forward, arcuate, longitudinal rise 245 (FIG. 18) and lateral rise 246 of left bottom wall 217 (FIG. 24) are provided to facilitate drawing the fall back into slot 220 as will become more clearly apparent presently. A thin, upstanding, longitudinal rib 247 integral with right bottom wall 216 and boss 226, having its left face coincident with right margin 218 and left side face 227 of boss 226, and rising flush with the upper face of left bottom wall 217, provides a right margin for slot 220 continuously opposed laterally to left margin 219 throughout the diverse forward, arcuate rises of the bottom walls (FIGS. 18 and 28).

Slot 220 is straight and of substantially uniform width throughout its length, except at the ends thereof. At the front end, the slot terminates a short distance below nose 223 (FIGS. 28 and 29) in a slight, arcuate, widening offset 248 to the left. Offset 248 is provided along its left inner side with a relatively large rounded chamfer or bevel 249. At the rear, right bottom wall 216 is cut away, beginning somewhat forward of rear wall 236, and extending laterally a distance sufficient to double the width of the slot (FIG. 50) to constitute a relief 250 joining an enlarged exit opening 251 in rear wall 236. As seen in FIGS. 24 and 27, opening 251 is offset to the right such that its lateral center coincides with right margin 218 of the slot. Provided to allow free exit of the knot, relief 250 and outlet opening 251 are of sufficient width, and opening 251 is of sufficient height, for the purpose.

As seen in FIGS. 24 and 49, the right half of opening 251 rises much higher than the arcuate left half 252 thereof to define a cove or notch 253, having a substantially vertical, left side margin 254 coincident with right bottom margin 218, and an arcuate right side margin 255 opening downwardly to join the right side of exit opening 251. The upper corner of relief 250 and the inner right corners of exit opening 251 and notch 253 are provided with mutually continuous, relatively large bevels or chamfers 256 and 257, respectively.

The inlet ramp, generally designated 258 (FIGS. 45, 56, 47, see also FIGS. 18, 19, 22, 26, 28, and 29), provided to control the disposition of the twine at the front of the bill assembly, as will be explained more fully hereinafter, is preferably fabricated of sheet metal as a stamping. The ramp comprises a planar, horizontally disposed, rearwardly extending, bracket arm 259 integrally joined at the rear to a generally transverse body portion 260 inclined rearwardly, downwardly, with respect to bracket arm 259, and having a reflexed left ramp portion constituting a forwardly inclined lip 261 which leaves body portion 260 in a bend line that diverges to the left, upwardly.

Body portion 260 is vertically taller than bracket arm 259, the latter joining the body portion approximately at its vertical center. The horizontal upper margin 262 of body portion 260 is vertically stepped to define, on the right, a lug 263 adapted to constrain the twice. Viewed in elevation from the rear, left margin 264 of the ramp is curved to define a fragmentary shield or heart shaped silhouette, sweeping upwardly and to the left in a gentle curve for approximately two thirds of its height and then sweeping inwardly somewhat more abruptly to meet horizontal top margin 262. The top and left margins of the inlet ramp are rounded and polished to promote movement of the twine therealong.

Bracket arm 259 has a forward terminal radius equal to half its width, and at the center thereof is circular aperture 265 adapted freely to receive mounting screw 266. A mounting nest for the ramp is provided in sheath 213 by producing horizontally elongate slot 267 through the right side wall and partially into reinforcing boss 226, so that the upper and lower walls of the slot closely embrace, and therefore vertically align, bracket arm 259. Slot 267 is produced to sufficient depth such that the head of screw 266 is under flush of the outer sheath surface, but leaves a wall of metal in boss 226 against which the inner face of bracket arm 259 rests. An appropriate circular threaded aperture produced in boss 226, concentric with the radius of the forward end of the slot, removably receives screw 266. Thus the ramp, constrained vertically, forwardly, and to the left by the walls of the slot, and to the right and rearwardly by the screw, is securely mounted in assembly. When assembled, lip 261 slightly overhangs, laterally to the left, bottom wall margin 219.

The outlet ramp, generally designated 268 (FIGS. 48, 49, and 50, see also FIGS. 18, 24, 26, and 27), is provided to trap and hold the new end of the standing part after it has been drawn out of the preceding knot, so that the end will protrude rearwardly in convenient attitude to be grasped by the fingers in order to initiate a succeeding tying operation (FIGS. 51, 69, 70, and 71).

Outlet ramp 268 is preferably fabricated as a stamping from relatively thin sheet metal. To the left, the ramp has a generally planar base portion 269 and, to the right, an integral rearwardly and laterally overhanging ramp portion 270 deflected arcuately downwardly. From straight, laterally disposed, forward margin 271 the right hand margin proceeds rearwardly for a short distance and then flares arcuately outwardly to the right to side terminal 272 defining the point of maximum width and depression and, thereafter, curves somewhat more abruptly inwardly toward the left, ultimately joining rear terminal portion 273. The left side margin leaves forward edge 271 perpendicularly, then curves rearwardly and to the right through an arc of about one quarter of a circle where, leaving the arc perpendicularly, it proceeds straight rearwardly for a distance and finally, after executing a rounded offset to the right, proceeds in a straight line to the rear, defining a short, rear, longitudinal land 274, along the left margin of rear terminal portion 273. Except for land 274, which in assembly closely abuts straight left side 254 of notch 253 in exit opening 251, the contour of the left side of the exit ramp is not functionally important, the shape disclosed simply conforming to the environment as mounted. The outlet ramp is mounted upon the upper face of boss 244 which is sloped downwardly toward the rear at an angle of some 15 degrees. A circular aperture 275 in base portion 269 freely receives a screw 276, which is securely but removably received by an appropriate threaded aperture in boss 244.

When assembled, as seen in FIGS. 24, 49, and 50, rear terminal 273 of the ramp projects rearwardly into notch 253, the under surface of terminal 273 being flush with the adjacent upper surface of the arcuate left half 252 of exit opening 251, land 274 abutting left side 254, and side terminal 272 slightly overhanging the right wall of exit opening 251. A clearance space or gap 277, of width barely sufficient to pass the largest twine to be used, exists between the rear portion of the arcuate right edge of the ramp and chamfered surface 257 of exit opening 251 and notch 253.

The sheath assembly is best assembled with the frame assembly before check 118, spring 111 and handle assembly 14 are mounted. After joining the frame and sheath by inserting and tightening hinge pin 109, spring 111 is inserted under pin 232 and screw 112 tightened, flexing the spring. Next mounted in sequence are the handle and finally the check.

When assembled, and with the sheath in closed position, rear edge 136 of the feeder is well ahead of the inner face of rear wall 236 of the sheath, since outboard ear 138 just clears the inner face of the inwardly sweeping rear end of left sidewall 215 of the sheath. Step 153 joining the base and shank portions of the bill lies directly above left margin 219 of slot 220 in the sheath, while, as previously noted, prong terminal 163 of the bill slightly overhangs to the right margin 218 of slot 220. The extreme left arcuate face of shank portion 150 of the bill clears the inner face of left side wall 215 of the sheath by a distance slightly greater than the diameter of the largest twine to be used. Similarly, arcuate bottom edge 183 of the shuttle tongue clears the upper face of left bottom wall 217 of the sheath by a distance slightly greater that the diameter of the largest twine to be used.

Having described the structure of the implement, I turn now to the operation thereof, taking up the threading operation first, the exterior operation next, and the interior operation last.

When starting each new ball or cone of twine, it will of course be necessary to thread the implement by running twine therethrough from the source of supply. If the ball holder 17 is in use, the twine is brought directly from the ball down groove 68 in the handle. If, on the other hand, either the extensible stem 18 or inextensible stem 19 is in use, the twine is threaded first through aperture 28 in the stem head and thence into groove 68. From this step onward the threading operation is identical for all twine supply accessories.

Referring to FIGS. 18 and 19, the twine is threaded through the thumb cavity in the handle, and then over the top of and behind thumb-piece 88 into intervening relation between the opposing friction generating surfaces of the tension controller. The sheath assembly 16 is now opened and the twine is led laterally to the left, under the frame at the front thereof, so that when drawn rearwardly it enters the chock 115. Drawn rearwardly, the twine next is snapped over terminal 140 of the feeder, resting on rear edge 136 thereof, where it is retained against dislodgement by terminal 140. In drawing the next few inches of additional twine, the latter automatically enters check 118 to rest under reed terminal 126. The twine is next threaded through slot 220 in the sheath. Then a tug on twine end 278 draws the sheath rearwardly until the snap action passes over center, whereupon the sheath snaps closed automatically, while continued tension on the twine draws the same along and over the top of outlet ramp 268 and rearwardly out of the sheath through notch 253 into the configuration shown in phantom in FIG. 18.

With the threading operation completed, the implement is now in standby mode, the twine extending rearwardly from the sheath exactly as it does following a tying operation, although the length of the twine protruding after threading is usually greater than that protruding after tying.

The twine coming from the supply source through the implement to end 278 may be regarded as the standing part 20 until the implement is brought into final binding relationship with a package where the twine parts may be further distinguished.

The exterior operation will now be described, reference being had in numerical sequence to FIGS. 51 through 58 inclusive. For reasons which will become apparent presently, the twine end 278 initially protruding from the rear of the sheath following each threading and binding operation must be brought forwardly along slot 220 in the sheath to protrude out of the front thereof. Such forward movement of the twine, changing the configuration thereof from standby to tying mode, is effected automatically in consequence of instinctive manipulation of the implement. As shown in FIG. 51, the handle is grasped between the thumb and forefinger of the right hand, the tension controller being released, while twine end 278 is grasped between the thumb and forefinger of the left hand, the middle, ring and little fingers of both hands being free to hold or manipulate the package. With the free fingers of the left hand resting on the package near the left side thereof, the implement is drawn to the right across the package, initiating a clockwise circuit, the motion of the implement naturally drawing the twine from the rear of the sheath forwardly along slot 220 toward the front thereof.

In order to provide freedom to move the implement under the package, the latter, in substantially the binding stage of FIG. 52, may be shifted toward the operator by using the free fingers of both hands, so that substantially half of the package overhangs the counter, table, bench or other surface supporting the same. During this package shifting stage, the free fingers of both hands may be brought into play if required but, subsequently, only the free fingers of the left hand are required to stabilize the package, so that the circuit of the right hand may be continued. As exemplified in FIG. 53 the clockwise circuit continues and, as the implement is moved downwardly at the right side of the package, the twine is automatically drawn upwardly in slot 220 to the nose end thereof, in which position the twine becomes trapped above the inlet ramp 258 and cannot accidentally be dislodged to return rearwardly until after the knot is tied, as will be more clearly apparent presently. Rearward twine part 11 may now be distinguished.

During the continuing motion of the implement to the left under the package, as exemplified in transitory position A of FIG. 54, the tendency of the standing part 20 to snag upon the package is prevented by its being led away from the package by the stem such as 19. Of course, in using the ball holder, such tendency is non-existent. In the upward phase of the circuit at the left side of the package, as exemplified in phantom in transitory position B, the twine emanating from the nose of the implement is retained by the inlet ramp so that it cannot accidentally return rearwardly in slot 220. The clockwise circuit of the implement is continued partially across the top of the package, the implement being swung around with its nose to the left so that slot 220 in the sheath is parallel with the direction of the binding and, if a small package, the implement is brought approximately to the center of the package; if a large package, at least several inches inboard from the left side, where it is brought to rest over rearward twine part 11, with slot 220 straddling the latter, and fiducial surface 239 of the sheath resting on the top surface of the package. The tension controller is now pressed with sufficient force positively to clamp or belay the standing part, and then the implement and end 278 are drawn in opposite longitudinal directions to cinch or tighten the binding, the end 278 being drawn somewhat upwardly as well as longitudinally. By the cinching operation the operator applies the desired amount of tension to the binding, and draws rearward twine part 11 up through slot 220 into operative position with the bill.

It should be emphasized at this point that the tension controller is held closed, with the standing part belayed, throughout the remainder of the tying operation. With the standing part belayed, the twine consumed in forming the knot and one end, i.e., end 12, is drawn in part from the twine encircling the package, not from the standing part; hence the knotting operation tends further to cinch the binding, resulting invariably in a taut binding.

With the implement in final position (FIG. 55) ready to tie the knot, the relative position of the knot with respect to the twine parts is finally determined, and the remainder of the latter may be distinguished, reference being had to FIGS. 1 and 72. The knot will be formed inside of the sheath approximately where the leading edge of the bill is presently located. That portion of the twine from the supply source through the implement to the leading edge of the bill is still designated the standing part 20, but that portion continuing on from the standing part beyond the leading edge of the bill and extending out the nose of the implement and around the package to the left is now designated forward part 10. That portion of the binding coming from the right side of the package and into the rear of the implement to the leading edge of the bill has already been distinguished as rearward part 11. The left portion or rearward part 11 now extending forwardly from the leading edge of the bill out through slot 220 and into the operator's left thumb and forefinger and including end 278, is designated the fall 279. Fall 279 is subject to variation in length depending upon the length of end 278, whatever additional length of twine, of any, that the operator is grasping, and where the operator finally places the implement with respect to his left hand. Hence the length of the fall, being variable, is unpredictable and the excess length is finally cut off near the knot, leaving end 13, as will appear presently. End 12 is cut off from the standing part.

As seen in FIG. 56 the fall 279, held under tension, is now swung around laterally to the left and then backwardly to the rear of the implement passing through succeeding transitory positions exemplified in phantom and designated C and D to the ultimate rearward position E where it snaps into slot 220 and exit opening 251 of the sheath. Entry of the fall into slot 220 as it is swung around is promoted by the easy forward and lateral rises 245 and 246, respectively, of the sheath walls, as well as the clearance provided under left bottom wall 240. For reasons which will become apparent later, the fall yields somewhat and then comes smartly to rest as it is brought straight rearwardly, generating a "snapping" sensation in the operator's left hand as well as an audible sound, automatically signaling the operator that the operation has reached the knot tying phase.

Next, as exemplified in FIG. 57, while maintaining rearward tension in the fall, the implement is pushed longitudinally forwardly a distance of the order of a couple of inches. This motion ties the knot, cuts the standing part free, leaving end 12, and draws the standing part over the outlet ramp and out through notch 253 of the sheath, where it remains protruding as new end 278′ in standby mode ready to be grasped for a succeeding tying operation. Finally, as exemplified in FIG. 58, by next shifting the implement longitudinally rearwardly while holding the fall so that it enters slots 205 of the fall cutter, the fall is cut off, leaving end 13. The fall just cut off is discarded.

It should be noted that in addition to the secure lateral grip afforded by the handle to the thumb and forefinger for binding, a secure longitudinal grip is also afforded for cinching, knotting, and cutting the fall, the forefinger being crooked around surfaces 74 and 75 of the handle insert, drawing rear handle surface 62 into the palm of the hand between the thumb and forefinger.

It should also be noted that the maximum size of package that may be tied with the implement is limited by the reach of the operator's arms, and that the minimum size thereof is limited by the length of the implement, being somewhat greater than the latter.

Throughout the girdling phase of the binding operation the tension controller may be left completely released if desired, since the friction naturally incidental to drawing the twine through the implement is ordinarily sufficient to provide light tension giving good control of the binding, the final cinching operation supplying the heavier tension essential for a taut binding. Substantially tensionless girdling reduces the effort required for binding, rendering the operation less fatiguing.

The tying operation just described is, of course, the basic single circuit tie which can be repeated in selected locations and directions around the package, either knotting at the end of each circuit, or making any desired number of circuits before knotting. Alternately, the familiar cross tie may also be executed if desired. This is accomplished by first completing at least one basic binding circuit, then turning the package a quarter revolution clockwise, as seen from above, to cross the twine, then completing at least another basic circuit at right angles to the first, and finally executing the knotting operations.

It should be noted that by holding the left hand stationary and executing a clockwise circuit with the implement, the implement ultimately (FIG. 54) comes up between the operator and his left hand, so that in being swung around to the rear (FIG. 56) the fall crosses over forward part 10 and when brought backwardly forms a U-loop about the former, constituting the first step in tying the knot. In tying the knot, the foregoing described relationship of the right and left hands should be maintained, otherwise a U-loop may not be formed and malfunctions may occur. For example, if the implement is held stationary and the left hand draws the twine about the package counter-clockwise, the left hand, since it cannot be crossed over the right, must inevitably come to rest at the end of a circuit between the operator and his right hand so that forward part 10 cannot be crossed by the fall. Under such conditions a knot normally would not be tied. In cross tying, the hands will not come ultimately into the proper relationship unless the crossing of the twine is done by rotating the package clockwise. In any event, the rules for correct operation are simple and consistent: (a) Execute all circuits with the implement in the right hand, moving the latter *clockwise*; (b) in cross tying, turn the package *clockwise*.

The threading and exterior operations having been described, I pass finally to the interior operation, reference being had in numerical sequence to FIGS. 59 through 72 inclusive in which only essential fragmentary portions of the components actually in work are shown.

The twine standing part 20 is shown fragmentarily, initiating at the point 280 just where it issues from check 118 and, although the latter is not shown, it will be understood that this point of issue is fixed in relation to the feeder so that the standing part is presented to the former invariably from the same relative point. This circumstance has a bearing on the operation of the feeder, as will become more clearly apparent presently.

Referring to FIG. 59, the standing part 20 leaves the check at a point 280, passes over rear edge 136 of the feeder and, as in phantom configuration F, thence downwardly and rearwardly over the outlet ramp 268, finally protruding rearwardly through notch 253 in the rear wall of the sheath, exteriorly to constitute outboard end 278. As previously noted, the latter configuration, designated the standby mode, obtains following all threading and tying operations. Description of the interior operation therefore begins with end 278 disposed in standby mode where, in initiating a tying operation, it is grasped by the thumb and forefinger of the left hand, as previously described with reference to FIG. 51.

In order to bring the standing part into opertive relation ship with the bill, the former must be brought under the feeder apron into the feeder channel and thence over the bill shank to protrude out of slot 220 at the nose of the sheath, the latter configuration (FIG. 60) being designated the tying mode.

When, with the tension controller released, the implement is moved to the right, as in FIG. 52, initiating the clockwise binding circuit, the standing part 20 is drawn relatively forwardly, sliding along the right margin of outlet ramp 268, as in transitory phantom position G and, after bypassing the former, moves on forwardly along slot 220. As previously noted, the bill prong terminal 163 slightly overhangs the right margin of slot 220. Hence, as the standing part passes on forwardly along slot 220 it is trapped by terminal 163 on the left side 162 of the prong, passing thereafter successively through transistory phantom positions such as H and I. Subsequently, as it is drawn upwardly the forward rise of slot 220, the standing part passes on through transitory phantom position J and, thereafter, continues upwardly and to the right over shank 150 of the bill, ultimately snapping into final configuration K to the right of step 153 of the bill shank and directly above slot 220.

As will be understood, longitudinal motion of twine in tension over a stationary ramp-like surface generates lateral motion of the twine conditioned by the direction and amount of slope of the surface and also by the direction of lead of the twine both inbound to and outbound from the surface.

Throughout the motion of the standing part along the left side of the bill shank through transitory position I, the angle of lead of the standing part portion outbound from the feeder rear edge 136 increases outwardly to the left, generating a tendency in the loop 281 flowing around rear edge 136 to migrate laterally to the left. On the other hand, the point of issue 280 of the standing part from the check is fixed, and the tendency to migrate outwardly just described is opposed by an opposite tendency to migrate inwardly generated by the component of tension in the outwardly canted, inbound portion of the standing part between point 280 and loop 281. The foregoing opposing tendencies are unbalanced, however, by the outwardly reducing width of the triangular feeder apron because the twine under tension tends to shorten its length by migrating outwardly thereon. Therefore, the opposing tendency to inward migration generated by the inbound portion is cancelled, with the net result that loop 281 migrates outwardly to the left until it abuts ear 138 which limits further migration. Thus, at the front, the standing part portion outbound from loop 281 initially passes to the left around and over the bill shank, but finally returns inwardly to the right, ultimately to lie to the right of step 153 as in the ultimate configuration K of FIG. 59. In passing around the bill shank, the standing part bypasses inlet ramp 258 and comes into final position directly over the latter, passing out of the sheath at the upper front end of slot 220, the terminal left offset 248 of which aides in permitting the twine to pass around the bill.

When the standing part has assumed the ultimate configuration K of FIG. 59, the angle of lead of the standing part portion outbound from loop 281 has become reversed, being now canted back toward the right, for at the front it is running over the bill shank at the right of step 153, while at the rear it is still running as loop 281 over feeder rear edge 136 at its farthest left position adjacent ear 138. The reversed angle of outbound lead now applies an inward component of tension toward the right on the loop 281, reinforcing the inward component already applied by the inbound portion. With both outbound and inbound portions now mutually reinforcing each other in generating an amplified, inwardly directed component of tension, the tendency to migrate outwardly due to the outwardly reducing width of the feeder apron is overcome. Consequently, loop 281 now migrates to the right along rear edge 136, the width of the loop increasing as the twine moves up the triangular apron. The outbound portion of the standing part runs along the lower, sharpened, front edge 135 of the feeder under increasing pressure as loop 281 migrates upwardly and to the right, as exemplified in transitory phantom position L, FIG. 60 drawing the outbound portion of the standing part toward, and finally into, the channel of the feeder to ultimate disposition in the tying mode configuration M.

Thus, when drawn forwardly along slot 220, the standing part automatically shifts from standby to tying mode through lateral migrations generated dynamically by the longitudinal motion of the twine through a distance of the order of several inches over the stationary, mutually coating, ramp-like surfaces of the bill and feeder.

The standing part is dynamically stable in the tying mode configuration K, M of FIG. 60 and remains in that configuration throughout any number of binding circuits about a package except that, due to the rearward slope of leading edge 158 of the bill, it would, if not otherwise constrained, dislodge therefrom if led too far rearwardly in slot 220. Such a rearward lead is most likely to occur acidently during the upward phase of the binding circuit at the left side of the package as in transitory position B, FIG. 54. But as exemplified in phantom configuration N, FIG. 60, such dislodgement is prevented by inlet ramp 258, the forwardly reflexed lip of which retains the standing part until brought substantially straight rearwardly in slot 220, a configuration so extreme that it never occurs accdiently in operation. The function of the inlet ramp just described in one of its two functions. The other function will be described presently.

FIG. 61 exemplifies the interior configuration of the twine generated by the exterior situation exemplified in FIG. 55. Adopting the twine part designations previously distinguished in describing FIG. 55, rearward part 11 has been drawn, slanted upwardly from the rear, into slot 220, lying under the outlet ramp, passing just over terminal 163 of the bill prong, under the shank of the bill, and over the inlet ramp, having moved somewhat laterally toward the left and finally back to center in bypassing the latter, as exemplified in transitory phantom position O. Rearward part 11 is prevented from upwardly bypassing the outlet ramp by downwardly deflected, right side terminal 272 of the latter which, as previously noted, overhangs the right margin of exit opening 251. Thus, while the standing part, suspended from above and drawn rearwardly from below, may upwardly bypass the outlet ramp, twine parts such as rearward part 11 and fall 279, disposed nearly horizontally under tension and drawn upwardly, may not do so. Attention is directed to the function of the slot 220, defined by the right and left side wall margins which serve laterally to guide and support the twine parts in operative relationship to the bill.

As previously explained in describing FIG. 55, the tension controller has been activated to belay or clamp the standing part and tension has been applied to cinch the binding. In the ensuing step, exemplified externally in FIG. 56 and internally in FIG. 62, the inlet ramp discharges its second function. As the fall is swung around to the rear, crossing forward part 10 and forming a loop about the latter, the inlet ramp sustains forward part 10 preventing occurance of the undesirable configuration exemplified in phantom and designated P where, if not so constrained, the fall would draw the forward part downwardly, ultimately causing a malfunction. Forward part 10 remains trapped on top of the inlet ramp until the fall has been swung completely around into slot 220 and exit opening 251, in which position most of the downward component of tension in the fall vanishes and the latter is released to migrate upwardly along the lip of the inlet ramp in a diminishing loop 282 as exemplified in transitory phantom position Q, FIG. 63. Loop 282, around both forward part 10 and the inlet ramp, is released suddenly from the inlet ramp at the upper margin thereof and, since the operator's left hand is drawing the fall rearwardly as loop 282 diminishes in size, the latter when released, snaps abruptly rearwardly, still around forward part 10, and finally lying under the bill shank and the outlet ramp as in transitory ultimate configuration R, FIG. 63.

Rearward part 11 with backwardly doubled fall 279, passing in a loop around forward part 10, as in ultimate configuration R just described, constitutes crudely the equivalent of a single block and fall which doubles the mechanical advantage. Stated otherwise, tension manually applied in the fall, the doubled back portion of rearward part 11 around forward part 10, tends, with doubled force, to draw forward part 10 under the bill shank. Since forward part 10 is already under tension, however, amplified pressure is instantaneously applied against the sloping ramp-like leading edge 158 of the bill, as the rearward motion of the operator's hand, initiated in stripping the fall from the inlet ramp, is transitorily arrested. The resulting impact force applied against the sloping leading edge of the bill initiates lateral motion, carrying forward part 10 and doubled parts 11 and 279, as a unit, transversely outwardly to the left, rising over step 153, and thence along and around the bill shank, drawing parts 11 and 279 through gap 187 over the shuttle and depositing them in channel 188 of the bill assembly (FIGS. 34 and 35), and also leading the standing part across the shuttle at an angle approximately coincident with that of notch 171, so that the standing part, crossing on top of parts 11 and 279, drops into notch 171. During the events just described, forward part 10 slips off of the inlet ramp and bypasses the latter to the left, as in intermediate, transitory phantom position S.

As the ultimate configuration T of FIG. 64 is attained, the parts have accelerated to considerable velocity, due both to rearward tension in the fall and the downward component of tension in the binding, and parts 11 and 279 slap left bill prong deck 190, emitting an audible sound as, simultaneously, the rearward motion of the fall is abruptly arrested, telegraphing a sensation along the tensed fall to the operator's fingers. These sensations signal the operator that the initial step of the knotting operation is completed and that the next step may be initiated. In the ultimate position T, FIG. 64, the fall cannot be drawn farther rearwardly since the parts have come to rest under tension, all slack having been continuously taken up by drawing the fall rearwardly (FIG. 56), so that the parts are jammed in equilibrium releasable only by forward, bodily movement of the implement.

Initially, in ultimate configuration R of FIG. 63, the standing part is above the open loop comprised of the rearward part and the fall while, finally, in the ultimate configuration T of FIG. 64, the parts have become relatively capsized or inverted, the standing part now being below the rearward part and the fall, after crossing over and partly encircling the latter two parts. Thus, in moving around the U-shaped bill shank from the upper to the lower leg thereof, the plane of the initially open loop around the bill shank has been rotated counter-clockwise, as viewed from the rear, through a half revolution, closing the formerly open loop. Naturally, the rotation introduces a half revolution twist such as 283 (FIG. 64) of the rearward part and the fall around each other. This latter twist is of no significance in the operation. It is ultimately neutralized exterior of the sheath as will be explained presently.

The ensuing internal operation, exemplified in FIGS. 65 through 70 inclusive, occurs during the external step exemplified in FIG. 57, where the knot forming operation is completed by bodily pushing the implement ahead a distance of the order of a couple of inches.

It should be borne in mind that the incipient knot of FIG. 65 remains substantially stationary in space, being constrained against forward motion by the backward tension manually applied in the fall (FIG. 57) and also by the tension generated in cinching the binding around the package and consequently, since the bill and feeder are fixed to the implement, they are during the succeeding operation, moving to the left, while the knot being formed remains relatively stationary in space.

FIG. 65 exemplifies the configuration of the twine with respect to the bill at a transitory instant immediately after the forward motion of the implement has been initiated. It will be noted that the standing part now forms, with the other parts, a closed loop about the bill prong. For brevity, I designate the latter loop the convolution 284, using the singular even though the loop is composed actually of three parts. As the rectilinear forward motion proceeds from the configuration of FIG. 65 to that of FIG. 66, the standing part 20 is trapped in the slot 173 of the shuttle, and the nose of the shuttle elevates parts 11 and 278 of the convolution 284 above the standing part 20, the forward platform or deck 192 (FIG. 34) providing a short length of twine between leading edge 158 of the bill and forward terminal 175 of the shuttle so that the latter wedges readily under the twine to initiate the elevation.

As seen in FIG. 66, the notch of the shuttle crosses the latter at an angle opposed to that of the parts 11 and 279 so that they cannot enter the notch and, riding upon the upper surface of the shuttle, slide freely across the notch without entrapment. As the convolution comes into the position exemplified in FIG. 66, it tends, due to the amplified fall tension, to girdle the bill assembly at a less acute angle; that is, to lie more nearly at a right angle to the longitudinal bill axis. Since a shorter length of twine is required to girdle the bill assembly at a right angle than any other angle, the convolution tends to loosen. To take up the slack thus developed and keep the convolution taut, tongue 168 with its arcuate lower edge 183 is provided on the shuttle. Due also to the amplified fall tension, the convolution tends to revolve around the bill assembly counter-clockwise, as viewed from the rear, tending to bring forward part 10 over the shuttle to the left side thereof and into channel 188 (FIG. 34), from which position it would be inextricable after the knot is tied. To counteract this latter tendency and maintain forward part 10 on the right side of the shuttle so that it can fall directly down through slot 220 to the package after the knot is tied, I provide the chamfer on the bottom edge of the shuttle tongue leaving the relatively sharp left corner previously described to bite into the twine and discourage rotation; and I also cant the bill at the six degree angle in plan, as previously noted, so that tension in forward part 10 applies a counteracting torque preventing rotation of the convolution.

FIG. 66 exemplifies the configuration at the instant that the standing part in slot 173 is contacted by the bow cutter 186, initiating the drawing of the bow forwardly through the convolution. At this instant the standing part tends to jam between upper face 175 of slot 173 and cutter 186 (FIG. 36), which, having its sharpest degree, that is, the base of the frustocone, on the right side, bites into the standing part, restraining it against subsequent movement to the left. Just subsequently, the standing part, now leaving the feeder apron laterally at approximately a right angle, strips off of lip 137, releasing some tension so that the standing part may shift out of the feeder channel and over to the left to lie against the right face of the shuttle. Otherwise stated, the standing part, belayed by the tension controller, is under relatively great tension, but the feeder automatically releases this tension sufficiently so that the standing part may shift laterally to the left, over against the shuttle and, thereafter, as the standing part strips off of edge 135 of the feeder, the latter automatically yields twine to the knot at the rate required even though the bill assembly and feeder are moving in unison, while the cutter jams the standing part forward of the knot preventing slack developing in the convolution. Right and left side decks 189 and 190, respectively, of the bill prong hold the convolution away from the standing part and parts 11 and

279 so that the bill assembly can slide freely through the convolution.

Continued motion of the bill assembly toward the left develops the transitory configuration of FIG. 67 where the bow, now being drawn through the convolution, tightens the knot by drawing twine from the convolution as the size of the latter is reduced, conditioned by the diminishing girth of the bill prong toward its terminal. Terminal deck 191 of the prong provides a flat land upon which the knot is formed while held under tensional control due both to the predetermined rate at which the bill tapers arcuately toward the terminal point and to the upward 10 *degree* bend of the latter. As seen in FIG. 67, the standing part has been stripped well along front edge 135 of the feeder apron, so that the former may pass directly into the convolution, permitting the latter to be tightly closed.

FIG. 68 exemplifies a transitory configuration an instant later than that of FIG. 67 as the bill terminal leaves the knot, and resistance to cutting the bow as previously described generates tension tightening the knot. Thus the bow cannot be cut until the tension reaches a predetermined level. This is an advantage, because uniformly tight knots invariably result. Although the blunt cutter, as previously described, dulls very gradually, the dulling tends to increase the tightness of the knots. That is to say, that the cutter wears safely.

FIG. 69 exemplifies a transitory configuration an instant later than that of FIG. 67, after the bow has been cut and the knot is completely free of the bill. Prior to cutting, increasing tension builds up in the muscles of the operator's right arm which, released suddenly as the twine is cut, generates an effortless "follow through," completing the motion.

While the bow has now been cut, the terminal of the standing part is frictionally gripped by the tightened knot, and its withdrawal from the knot requires appreciable tension. The standing part, in swinging downwardly and rearwardly from rear edge 136 of the feeder apron, lowers the knot, allowing it to pass under the outlet ramp, and also yields additional twine by sliding downwardly and to the left along rear edge 136. As the outlet ramp passes over the knot, the standing part is drawn first along the right margin thereof (FIG. 69) and then over the outlet ramp through gap 277 and rearwardly out of notch 253 (FIG. 70) as the implement moves away, ultimately to draw the standing part out of the knot. Of course, the fall is being held under tension by the operator, and as soon as the standing part is free of the knot, the latter is automatically drawn closed by the tension in the fall, opposed by equilibrating tension in forward part 10. The standing part, withdrawn from the knot, is left protruding in standby mode as new end 278' (FIG. 71), supported on the outlet ramp above the package and therefore clear of the same. Check 118 prevents any tension accidentally induced in the standing part from drawing end 278' back inside the sheath where it could not be conveniently grasped. Due to tension in the fall, twist 283 unwinds as soon as the standing part is withdrawn from the knot just subsequent to the transitory configuration exemplified in FIG. 70.

As seen in FIG. 71, the fall cutter is next brought into play, as previously described, to trim the fall leaving an end 13 crudely of the same length as end 12. It should be noted that tension induced in the fall in consequence of resistance to cutting tends further to tighten the knot by applying a rearward component of tension in the fall opposed by equilibrating tension induced in forward part 10. Depending upon the angle at which the operator presents the fall to the cutter, the latter tends to "shave" the fall, removing some lint from the latter. Fragmentary circular inlargement 207 communicating with slot 205 in the cutter body eliminates choking of the cutter with lint by providing an escape opening for the latter.

Although in tying mode the standing part initially passes over the bill shank some distance above the package surface, the bill is proportioned so that all slack developed during the tying of the knot is taken up automatically. Due in part to the proportions of the bill and shuttle and in part to the continuous application of tension in the fall, all slack in the convolution is ultimately drawn out of the latter, and the convolution is tightened by resistance to cutting the bow developed by the cutter. Thus without adjustment or alteration the implement functions successfully throughout a relatively wide range of twine sizes.

The end result of the operation of the implement as hereinbefore described is a taut binding conjoined by the doubly securely tied left-handed weaver's knot exemplified in FIG. 72.

While I have applied my knotter in a manually operable implement, it is to be understood that the former, either in whole or in part, may be useful also in power driven machinery.

With full understanding now had of the details, the general principles of the knot tying operation may be illuminated by briefly retracting the latter from a somewhat different point of view.

Referring momentarily to FIG. 1 it will be noted that the weaver's knot may be visualized as two intertwined loops, the first a rearwardly opening U-loop, which I designate the loop, comprised of rearward part 11 and end 13 around forward part 10 and, the second, an O-loop or half hitch comprised of part 10 and end 12 around the first loop.

Formation of the U-loop requires the equivalent of only a half revolution of wrapping or girdling motion around forward part 10, which motion is executed by swinging the fall around rearwardly as exemplified in FIGS. 56 and 63. It remains, then, to form the half hitch around the loop. Now in order completely to encircle the loop, formation of the half hitch requires the equivalent of at least a full revolution of wrapping or girdling motion of end 12 around the loop. Heretofore, in order to form this full circuit, rotating machinery has been employed. But I avoid the necessity for rotating machinery by performing the girdling motion with two separate, successive rectilinear motions. The first rectilinear motion is the drawing of the fall rearwardly which, acting upon the ramp-like leading edge of the bill, shifts the parts around the U-shaped bill shank from the upper to the lower leg thereof, generating, by inversion, the first half of the required full revolution, and by the resulting crossing of the standing part over the other parts, an additional quarter revolution, totaling three quarters of the required revolution. The equivalent of the fourth quarter of the full revolution is generated by the rectilinear forward motion of the bill assembly which, although continuous, may be viewed as comprised of two successive constituent phases. The first phase, due to the acclivity of the shuttle nose, causes an elevation of the loop with respect to the partially formed half hitch, as seen in FIG. 66; and the second phase constitutes the rectilinear drawing of a bow of the standing part under the loop as exemplified in FIG. 67, concluding formation of the half hitch and of the intertwined configuration of both loops of the weaver's knot, but in slippery form.

Continuation of the same rectilinear motion next tightens the half hitch upon the loop by drawing the bow taut, then severs the bow and finally draws the end of the standing part, as half of the severed bow, out of the knot, which is simultaneously initially tightened by rectilinearly applied tension in the fall equilibrated by reacting tension in the forward part and then, subsequently, finally tightened by cutting the fall under tension induced therein by reverse rectilinear motion of the fall cutter, opposed by reacting tension induced in the forward part.

The means heretofore disclosed, namely, the implement constructed and operated as shown and described, constitutes the best mode presently known to me of carrying out the method of the invention. Although readily discernible from the description read in connection with the drawings, the salient steps of the method are now briefly reviewed.

Holding the end of the twine substantially stationary, and with the standing part being supported away from the package, the former is drawn around the package to girdle the same, the standing part ultimately being drawn past the end to cross the latter. Then, by drawing in opposite directions on the end and the standing part, the binding is cinched, and the end is doubled back under tension around the standing part to constitute the loop of a weaver's knot, the doubled back portion including the end being designated the fall. Then, with tension continuously applied in the fall, the half hitch of the weaver's knot is next partly formed around the loop by inverting the plane containing the standing part and the loop, thus wrapping the standing part partially around the loop. The parts of the loop are next elevated with respect to the partially formed half hitch, and then a bow of the standing part is drawn under the loop a sufficient distance to complete the half hitch and tighten the latter upon the loop, forming transistorily a slippery weaver's knot. Next, with the fall still held under tension opposed by reacting tension in the forward part, the bow is severed, and then the end of the standing part, constituting a portion of the severed bow, is drawn out of the knot. Finally, again under tension opposed reacting by tension in the forward part, the fall is cut, additionally tightening the knot.

An end of the standing part suitable for grasping to initiate a succeeding tying operation is fed out of the sheath by the steps of the method just described wherein a slippery knot having the end of the standing part as a portion of the bow is first transistorily tied within the sheath, then the bow is severed and, finally, with the standing part held stationary relative to the sheath, the knot is moved relatively out of the sheath, thus drawing the end of the standing part out of the sheath and ultimately out of the knot.

While I have shown and described in detail a specific physical embodiment bracing, in respect of construction, operation, and method, the best mode presently known to me of carrying out the invention, I do not wish to be limited to the details described and shown, as many modifications may be made within the scope of the invention which is defined, not by the details of the foregoing description and drawings, but by the following claims.

I claim:

1. A tying implement comprising, structure adapted for manually propelled girdling motion about a package to be tied with twine, twine support means carried by said structure, tension control means carried by said structure and operable upon said twine, check means carried by said structure and adapted unidirectionally to restrict longitudinal motion of said twine relative to said structure, knot tying means carried by said structure and operable upon said twine, and twine cutter means operably associated with said knot tying means.

2. The implement according to claim 1 in which said twine support means constitutes a stem having a twine embracing portion overhanging said structure.

3. The implement according to claim 2 in which said twine embracing portion is adjustable toward and away from said structure.

4. The implement according to laim 1 in which said twine support means comprises a twine ball holder having portions embracing said twine ball.

5. The implement according to claim 4 in which said portions comprise resilient prongs having inwardly reflexed terminals.

6. The implement according to claim 1 in which said structure includes a handle portion.

7. The implement according to laim 6 in which said handle portion is constructed and arranged to be gripped between the thumb and forefinger of one hand while resting partially against the palm of said hand, leaving the remaining fingers of said hand free to hold or manipulate said package.

8. The implement according to claim 7 in which said handle portion is positioned above and laterally of said knot tying means.

9. The implement according to claim 7 in which said handle portion is inclined laterally.

10. The implement according to claim 7 in which said handle portion is inclined longitudinally.

11. The implement according to claim 1 in which said tension controller comprises two resiliently connected, spaced apart, complementary portions adapted to straddle said twine and frictionally engage the same responsive to pressure exerted upon said portions by and between the thumb and forefinger.

12. The implement according to claim 1 in which said structure carries a chock adapted to guide twine passing from said tension controller to said knot tying means, an inlet ramp at the front of the implement adapted to control the twine exiting the front of the implement, and an outlet ramp at the rear of the implement to retain a twine end exteriorly of the implement.

13. The implement according to claim 1 in which said check means comprises a resilient reed having a fixed terminal and a free terminal, a surface immobilely associated with said fixed terminal and spaced from said free terminal, said free terminal and said surface adapted simultaneously to contact twine therebetween, said free terminal adapted resiliently to deflect away from said surface to release said twine responsive to longitudinal motion thereof in one direction and resiliently to deflect toward said surface to clamp said twine responsive to attempted longitudinal motion thereof in the opposite direction.

14. The implement according to claim 1 in which said structure carries a fiducial surface adapted to rest upon said package and position said knot tying means relative thereto.

15. The implement according to claim 1 in which said structure carries a sheath adapted at least partially to enclose said knot tying means.

16. The implement according to claim 15 in which said sheath comprises means adapted to guide said twine and dispose the latter in operative relationship to said knot tying means.

17. The implement according to claim 15 in which said sheath has a fiducial surface adapted to rest upon said package and position said knot tying means relative thereto.

18. The implement according to claim 15 inwhich said sheath is hingedly connected to said structure.

19. The implement according to claim 18 in which resilient means urges said sheath alternately into the closed or open position.

20. The implement according to claim 1 in which said knot tying means is operable responsive to bodily movement of said implement relative to said package.

21. The implement according to claim 20 in which said bodily movement is rectilinear.

22. The implement according to claim 1 in which said knot tying means is adapted to tie the weaver's knot.

23. The implement according to claim 1 in which said knot tying means comprises twine feeder means and twine intertwining means, said feeder means automatically disposing said twine in operative relationship to said intertwining means.

24. The implement according to claim 23 in which said feeder means comprises a relatively stationary member having a ramp-like surface adapted to impart a lateral component of motion of twine drawn longitudinally under tension thereover.

25. The implement according to claim 23 in which said twine intertwining means constitutes a bill fixedly associated with said structure, said bill comprising a mounting portion, a shuttle portion, and a shank portion joining said mounting portion and said shuttle portion.

26. The implement according to claim 25 in which said bill is fixed in angular relationship to said structure.

27. The implement according to claim 25 in which said shank portion is reflexed to define a channel, one end of said channel being sloped to constitute ramp for movement of twine therealong.

28. The implement according to claim 25 in which said shuttle portion includes said twine cutter means, said shuttle portion being adapted to form a knot having a bow, and said twine cutter means being adapted at least partially to sever said bow.

29. The implement according to claim 28 in which said twine cutter means comprises a fixed disc having a peripheral cutting edge and a planar surface fixed contiguous to said cutting edge, whereby twine drawn under tension against said cutting edge along said surface and supported thereby is at least partially severed by said cutting edge.

30. The implement according to claim 29 in which a dulled portion of said cutting edge may be inactivated, and a sharp portion thereof activated, by revolving said cutter.

31. The implement according to claim 1 in which second twine cutter means is associated with said structure adapted responsive to bodily movement of said implement to sever the end of said twine and simultaneously tighten the knot tied by said knot tying means.

32. The implement according to claim 31 in which said second twine cutter means comprises a body member secured to said structure, said body member having a cylindrical socket, an arcuate slot in said socket and concentric therewith, and a straight slot cleaving said body and intersecting said socket, one margin of said slot being tangent to the periphery of said socket; a disc-like cutter disposed in said socket, said cutter having a peripheral cutting edge and a plurality of angularly spaced radially disposed apertures, the radial location of said apertures being similar to the radial location of said arcuate slot in said body member, some of said apertures having angular spacing similar to the angular length of said arcuate slot, and two adjacent of said apertures having angular spacing equal to twice the angular length of said slot; and means for clamping and unclamping said cutter relative to said body.

33. A bill for tying the weaver's knot when moved rectilinearly comprising a generally U-shaped member, one leg of the member being a shank portion and the other leg a prong portion, means on said member for supporting in spaced apart relationship a twine part and a loop of twine preformed around said twine part; means for inverting the relative positions of said twine part and said loop to partially form a half hitch of said twine part around said loop; surface means on the shank portion for elevating said loop; surface means between the shank and prong portions for drawing said twine part under said loop to complete a half hitch having a bow about said loop; twine grasping means on said prong portion for drawing said bow to tighten said knot; surface means on said prong portion for controlling the orientation of said knot as said loop is drawn; and severing means for said bow associated with said twine grasping means, said severing means being operable responsive to predetermined tension developed in said bow.

34. A tying implement adapted for girdling motion about a package to be tied comprising a frame; a handle secured to said frame, said handle adapted to be gripped between the thumb and forefinger of one hand; twine support means carried by said handle; twine tension control means associated with said handle and operable responsive to pressure exerted thereon by and between said thumb and forefinger; a twine check carried by said frame; knot tying expedients disposed along said frame and fixed to the latter, said expedients comprising a twine feeder and a knotting bill; said feeder adapted automatically to dispose twine in operative relationship to said bill responsive to longitudinal motion of said twine relative thereto; said knotting bill adapted to tie the weaver's knot responsive to longitudinal motion of said implement relative to said package and comprising a mounting portion, a shank portion reflexed into channel form, and a shuttle portion adapted to form a bow; cutter means associated with said shuttle portion and adapted to sever said bow; a sheath at least partially enclosing said knot tying expedients and comprising portions adapted to guide twine in operative relationship to said knot tying expedients and to space the latter from said package, said sheath being movably connected with said frame for opening and closing motion relative thereto; and means for retaining said sheath in at least the closed position.

35. The method of manually tying a package with twine threaded through an implement, said twine including an end and a standing part, which comprises holding said end substantially stationary with respect to said package while drawing said standing part peripherally around said package to cross said end, a portion of the standing part during said drawing being supported away from the package; drawing simultaneously oppositely on said end and said standing part to tension said twine about said package, and then tying a knot with said implement while holding said end and said standing part under tension.

36. The method according to claim 35 in which said knot is a weaver's knot.

37. The method according to claim 36 in which said weaver's knot is tied by first doubling said end back around said standing part to form a loop while maintaining tension in said twine; revolving the intersection of said standing part and said loop substantially one-half revolution about an axis approximately parallel to the axis of said loop to bring said standing part across and partly around said loop to partially form a half hitch around said loop; elevating said loop; drawing said standing part thereunder to form the bow of a slippery half hitch about said loop; drawing simultaneously oppositely on said bow and said end to close said half hitch around said loop; severing said bow; and finally drawing the severed standing part out of said half hitch while maintaining tension on said end.

38. The method according to claim 37 having as an additional step severing said end at a point near said knot.

39. The method of feeding the end of a length of twine out of a partial enclosure which comprises first tying a slippery knot having a bow in said twine, said end being a portion of said bow; then severing said bow; and finally moving said knot relative to said partial enclosure to draw said end from said enclosure and finally from said knot.

40. An implement for tying twine extending about an object for binding purposes comprising a body having means for receiving twine threaded therethrough and extending out of the body and about a package; a twine feeder secured to the body; a bill member secured to the body in spaced relation to the feeder; said feeder and bill member directing the twine about the bill member in a loop responsive to manipulation of the twine exteriorily of the body; and a means within the body responsive to longitudinal movement of the implement in a direction along the twine binding the object to pull a portion of the twine through the loop knotting the same on the bill member and subsequently withdrawing the knot from the bill member and out of the implement.

41. An implement for tying twine extending about an object for binding purposes comprising a body having twine threaded therethrough and extending from the body about the object to be bound; a knot tying bill mounted on and in stationary relation to the body; means in the body for directing portions of the twine to the bill with portions of the twin encircling the bill responsive to manipulation of the free end of the twine fore to aft relative to the body held stationary over the twine binding the object; and a stationary means in the body for pulling other portions of the twine through the twine portions encircling the bill responsive to longitudinal motion of the implement over the twine binding the object creating a knot in such twine within the implement.

42. A tying implement for twine and the like comprising a body having means to receive twine threaded therethrough; knot tying bill means immovably carried in the body and operable upon the twine to form a knot under tension, immovable feeder means in the body spaced from the knot tying means for directing the twine into the latter means; and a stationary twine guiding surface means in the body for intertwining two loops in the twine into a knot while the twine is tensioned and the implement moved legnthwise of the twine.

43. A knot tying bill for tying the weaver's knot when moving longitudinally of tensioned twine comprising: a bill having a shank portion and a spaced prong portion with twine guiding surfaces intermediate such portions, said shank portion having a support for a twine part and a loop of twine preformed around the twine part, surfaces on the bill guiding the twine part and loop to invert their relative positions during a portion of said longitudinal movement partially forming a half hitch of the twine part about said loop; means on the bill for drawing the twine part under the loop completing such half hitch with a bow about the loop; means on the bill for severing the loop as continued movement of the bill relative to the tensioned twine moves the knot along the bill, such last means tensioning the bow and withdrawing the severed twine end out of the bow leaving a completed weaver's knot.

44. The method of removing a completed weaver's knot in twine from a knot tying device having a stationary bill therein about which the knot is formed comprising the steps of first tying a slippery knot about the bill having a bow in the twine, moving the device relative to the twine to move the knot off the bill while holding the bow to tension the knot, severing the bow leaving an end of the twine in the knot and holding such twine end during further movement of the device away from the knot to remove the end from the knot.

45. In an implement, a twine cutter means comprising: a body member secured to a support, said body member having a cylindrical socket, means forming an accurate slot in the socket and concentric therewith, means forming a straight slot cleaving the body and intersecting the socket, one margin of the slot being tangent to the periphery of the socket; a disc-like cutter disposed in the socket, such cutter having a peripheral cutting edge and a plurality of angularly spaced apart radially disposed apertures, the radial location of such apertures being similar to the radial location of said arcuate slot in the body member, at least two of such apertures being spaced apart a distance similar to the angular length of said acurate slot and at least two of such apertures being spaced apart a distance about twice the angular length of said arcuate slot, and means for clamping and unclamping said cutter relative to said support.

46. An implement for tying a knot in twine comprising: a housing containing knot tying structure adapted to receive twine therein and a handle for manually moving the housing relative to the twine to be tied, said handle having a thumb resess on one side and a forefinger grip area on an opposite side with a surface between said recess and a grip area shaped to repose against a person's hand part extending between thumb and forefinger, said handle being solely supported by the said thumb and forefinger and said hand part leaving the remaining fingers of the hand free.

References Cited
UNITED STATES PATENTS

| | | |
|---|---|---|
| 727,424 | 5/1903 | Orell. |
| 783,585 | 2/1905 | Larson et al. |
| 789,467 | 5/1905 | West. |
| 827,666 | 7/1906 | Quinn. |
| 895,277 | 8/1908 | Larson. |
| 1,521,860 | 1/1925 | Brendel. |
| 2,234,190 | 3/1941 | Noling _____ 289—1.5 |
| 2,287,311 | 6/1942 | Huffstickler _____ 289—3 |
| 2,716,035 | 8/1955 | Thorndike _____ 289—13 |
| 2,821,421 | 1/1958 | Smith _____ 289—3 |

LOUIS K. RIMRODT, *Primary Examiner.*

U.S. Cl. X.R.

289—3